US010459652B2

(12) United States Patent
Davis et al.

(10) Patent No.: US 10,459,652 B2
(45) Date of Patent: Oct. 29, 2019

(54) EVACUATING BLADES IN A STORAGE ARRAY THAT INCLUDES A PLURALITY OF BLADES

(71) Applicant: Pure Storage, Inc., Mountain View, CA (US)

(72) Inventors: John Davis, San Francisco, CA (US); Warren Jew, Foster City, CA (US)

(73) Assignee: Pure Storage, Inc., Mountain View, CA (US)

( * ) Notice: Subject to any disclaimer, the term of this patent is extended or adjusted under 35 U.S.C. 154(b) by 138 days.

(21) Appl. No.: 15/266,006

(22) Filed: Sep. 15, 2016

(65) Prior Publication Data

US 2018/0032279 A1     Feb. 1, 2018

Related U.S. Application Data

(60) Provisional application No. 62/367,619, filed on Jul. 27, 2016.

(51) Int. Cl.
    *G06F 3/06*     (2006.01)
    *G06F 11/00*     (2006.01)
    *G06F 11/20*     (2006.01)

(52) U.S. Cl.
    CPC .......... *G06F 3/0647* (2013.01); *G06F 3/067* (2013.01); *G06F 3/0611* (2013.01);
(Continued)

(58) Field of Classification Search
    CPC .... G06F 3/0647; G06F 3/0611; G06F 3/0659; G06F 3/0683
    See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |

(Continued)

FOREIGN PATENT DOCUMENTS

| | | |
|---|---|---|
| EP | 0725324 A2 | 8/1996 |
| WO | 2009055368 A2 | 4/2009 |

(Continued)

OTHER PUBLICATIONS

The International Search Report and the Written Opinion received from the International Searching Authority (ISA/EPO) for International Application No. PCT/US2016/036693, dated Aug. 29, 2016, 10 pages.

(Continued)

*Primary Examiner* — Ramon A. Mercado
(74) *Attorney, Agent, or Firm* — Womble Bond Dickinson (US) LLP

(57) ABSTRACT

Evacuating blades in a storage array that includes a plurality of blades, including: detecting an occurrence of a blade evacuation event associated with one or more blades; iteratively until migration has completed for each of the blades associated with the blade evacuation event: selecting, in dependence upon a blade redundancy policy, one or more next blades to be evacuated from the storage array; migrating, from the one or more next blades to one or more blades in the storage array that are not associated with the blade evacuation event, data stored on the next blade; and migrating, from the one or more next blades to one or more blades in the storage array that are not associated with the blade evacuation event, storage array computational workloads executing on the one or more next blades.

19 Claims, 11 Drawing Sheets

US 10,459,652 B2
Page 2

(52) U.S. Cl.
CPC .......... *G06F 3/0617* (2013.01); *G06F 3/0659* (2013.01); *G06F 3/0683* (2013.01); *G06F 3/0689* (2013.01); *G06F 11/00* (2013.01); *G06F 11/203* (2013.01)

(56) References Cited

U.S. PATENT DOCUMENTS

| | | | |
|---|---|---|---|
| 5,933,598 | A | 8/1999 | Scales et al. |
| 6,012,032 | A | 1/2000 | Donovan et al. |
| 6,085,333 | A | 7/2000 | DeKoning et al. |
| 6,643,641 | B1 | 11/2003 | Snyder |
| 6,647,514 | B1 | 11/2003 | Umberger et al. |
| 6,789,162 | B1 | 9/2004 | Talagala et al. |
| 7,089,272 | B1 | 8/2006 | Garthwaite et al. |
| 7,107,389 | B2 | 9/2006 | Inagaki et al. |
| 7,139,809 | B2 * | 11/2006 | Husain ................. H04L 41/0803 709/213 |
| 7,146,448 | B2 * | 12/2006 | Davies ................. G06F 11/2005 710/302 |
| 7,146,521 | B1 | 12/2006 | Nguyen |
| 7,334,124 | B2 | 2/2008 | Pham et al. |
| 7,437,530 | B1 | 10/2008 | Rajan |
| 7,493,424 | B1 | 2/2009 | Bali et al. |
| 7,669,029 | B1 | 2/2010 | Mishra et al. |
| 7,689,609 | B2 | 3/2010 | Lango et al. |
| 7,743,191 | B1 | 6/2010 | Liao |
| 7,899,780 | B1 | 3/2011 | Shmuylovich et al. |
| 8,042,163 | B1 | 10/2011 | Karr et al. |
| 8,086,585 | B1 | 12/2011 | Brashers et al. |
| 8,194,534 | B2 * | 6/2012 | Pandey ................. H04L 49/70 370/216 |
| 8,271,700 | B1 | 9/2012 | Annem et al. |
| 8,387,136 | B2 | 2/2013 | Lee et al. |
| 8,437,189 | B1 | 5/2013 | Montierth et al. |
| 8,465,332 | B2 | 6/2013 | Hogan et al. |
| 8,527,544 | B1 | 9/2013 | Colgrove et al. |
| 8,566,546 | B1 | 10/2013 | Marshak et al. |
| 8,578,442 | B1 | 11/2013 | Banerjee |
| 8,613,066 | B1 | 12/2013 | Brezinski et al. |
| 8,620,970 | B2 | 12/2013 | English et al. |
| 8,751,463 | B1 | 6/2014 | Chamness |
| 8,762,642 | B2 | 6/2014 | Bates et al. |
| 8,769,622 | B2 | 7/2014 | Chang et al. |
| 8,800,009 | B1 | 8/2014 | Beda, III et al. |
| 8,812,860 | B1 | 8/2014 | Bray |
| 8,850,546 | B1 | 9/2014 | Field et al. |
| 8,898,346 | B1 | 11/2014 | Simmons |
| 8,909,854 | B2 | 12/2014 | Yamagishi et al. |
| 8,931,041 | B1 | 1/2015 | Banerjee |
| 8,949,863 | B1 | 2/2015 | Coatney et al. |
| 8,984,602 | B1 | 3/2015 | Bailey et al. |
| 8,990,905 | B1 | 3/2015 | Bailey et al. |
| 9,124,569 | B2 | 9/2015 | Hussain et al. |
| 9,134,922 | B2 | 9/2015 | Rajagopal et al. |
| 9,209,973 | B2 | 12/2015 | Aikas et al. |
| 9,250,823 | B1 | 2/2016 | Kamat et al. |
| 9,300,660 | B1 | 3/2016 | Borowiec et al. |
| 9,444,822 | B1 | 9/2016 | Borowiec et al. |
| 9,507,532 | B1 | 11/2016 | Colgrove et al. |
| 2002/0013802 | A1 | 1/2002 | Mori et al. |
| 2003/0145172 | A1 | 7/2003 | Galbraith et al. |
| 2003/0191783 | A1 | 10/2003 | Wolczko et al. |
| 2003/0225961 | A1 | 12/2003 | Chow et al. |
| 2004/0080985 | A1 | 4/2004 | Chang et al. |
| 2004/0111573 | A1 | 6/2004 | Garthwaite |
| 2004/0153844 | A1 | 8/2004 | Ghose et al. |
| 2004/0193814 | A1 | 9/2004 | Erickson et al. |
| 2004/0260967 | A1 | 12/2004 | Guha et al. |
| 2005/0010715 | A1 * | 1/2005 | Davies ................. G06F 11/1456 711/100 |
| 2005/0160416 | A1 | 7/2005 | Jamison |
| 2005/0188246 | A1 | 8/2005 | Emberty et al. |
| 2005/0216800 | A1 | 9/2005 | Bicknell et al. |
| 2005/0256972 | A1 * | 11/2005 | Cochran ............. G06F 11/2071 709/245 |
| 2005/0257213 | A1 * | 11/2005 | Chu ................. G06F 11/2028 717/170 |
| 2006/0015771 | A1 | 1/2006 | Vana Gundy et al. |
| 2006/0129817 | A1 | 6/2006 | Borneman et al. |
| 2006/0161726 | A1 | 7/2006 | Lasser |
| 2006/0184760 | A1 * | 8/2006 | Fujibayashi .......... G06F 3/0607 711/170 |
| 2006/0212636 | A1 * | 9/2006 | Yasuo ................. G06F 1/263 710/303 |
| 2006/0230245 | A1 | 10/2006 | Gounares et al. |
| 2006/0239075 | A1 | 10/2006 | Williams et al. |
| 2007/0022227 | A1 | 1/2007 | Miki |
| 2007/0028068 | A1 | 2/2007 | Golding et al. |
| 2007/0055702 | A1 | 3/2007 | Fridella et al. |
| 2007/0109856 | A1 | 5/2007 | Pellicone et al. |
| 2007/0143557 | A1 * | 6/2007 | Uppala ................. G06F 3/0607 711/165 |
| 2007/0150689 | A1 | 6/2007 | Pandit et al. |
| 2007/0168321 | A1 | 7/2007 | Saito et al. |
| 2007/0220227 | A1 | 9/2007 | Long |
| 2007/0294563 | A1 | 12/2007 | Bose |
| 2007/0294564 | A1 | 12/2007 | Reddin et al. |
| 2008/0005587 | A1 | 1/2008 | Ahlquist |
| 2008/0046647 | A1 * | 2/2008 | Blinick ................. G06F 3/0626 711/114 |
| 2008/0077825 | A1 | 3/2008 | Bello et al. |
| 2008/0126715 | A1 * | 5/2008 | Fujie ................. G06F 3/0626 711/154 |
| 2008/0162674 | A1 | 7/2008 | Dahiya |
| 2008/0195833 | A1 | 8/2008 | Park |
| 2008/0270678 | A1 | 10/2008 | Cornwell et al. |
| 2008/0282045 | A1 | 11/2008 | Biswas et al. |
| 2009/0077340 | A1 | 3/2009 | Johnson et al. |
| 2009/0100115 | A1 | 4/2009 | Park et al. |
| 2009/0150883 | A1 | 6/2009 | Tripathi et al. |
| 2009/0198889 | A1 | 8/2009 | Ito et al. |
| 2010/0052625 | A1 | 3/2010 | Cagno et al. |
| 2010/0064166 | A1 * | 3/2010 | Dubnicki ................. G06F 11/14 714/4.1 |
| 2010/0180025 | A1 | 7/2010 | Kern et al. |
| 2010/0211723 | A1 | 8/2010 | Mukaida |
| 2010/0246266 | A1 | 9/2010 | Park et al. |
| 2010/0257142 | A1 | 10/2010 | Murphy et al. |
| 2010/0262764 | A1 | 10/2010 | Liu et al. |
| 2010/0325345 | A1 | 12/2010 | Ohno et al. |
| 2010/0332754 | A1 | 12/2010 | Lai et al. |
| 2011/0072290 | A1 | 3/2011 | Davis et al. |
| 2011/0125955 | A1 | 5/2011 | Chen |
| 2011/0131231 | A1 | 6/2011 | Haas et al. |
| 2011/0134749 | A1 * | 6/2011 | Speks ................. G06F 11/2028 370/217 |
| 2011/0167221 | A1 | 7/2011 | Pangal et al. |
| 2012/0023144 | A1 | 1/2012 | Rub |
| 2012/0054264 | A1 | 3/2012 | Haugh et al. |
| 2012/0079318 | A1 | 3/2012 | Colgrove et al. |
| 2012/0131253 | A1 | 5/2012 | McKnight et al. |
| 2012/0303919 | A1 | 11/2012 | Hu et al. |
| 2012/0311000 | A1 | 12/2012 | Post et al. |
| 2013/0007845 | A1 | 1/2013 | Chang et al. |
| 2013/0031414 | A1 | 1/2013 | Dhuse et al. |
| 2013/0036272 | A1 | 2/2013 | Nelson |
| 2013/0071087 | A1 | 3/2013 | Motiwala et al. |
| 2013/0145447 | A1 | 6/2013 | Maron |
| 2013/0191555 | A1 | 7/2013 | Liu |
| 2013/0198459 | A1 | 8/2013 | Joshi et al. |
| 2013/0205173 | A1 | 8/2013 | Yoneda |
| 2013/0219164 | A1 | 8/2013 | Hamid |
| 2013/0227201 | A1 | 8/2013 | Talagala et al. |
| 2013/0275802 | A1 * | 10/2013 | Endo ................. G06F 11/1076 714/6.23 |
| 2013/0290607 | A1 | 10/2013 | Chang et al. |
| 2013/0311434 | A1 | 11/2013 | Jones |
| 2013/0318297 | A1 | 11/2013 | Jibbe et al. |
| 2013/0332614 | A1 | 12/2013 | Brunk et al. |
| 2014/0020083 | A1 | 1/2014 | Fetik |
| 2014/0074850 | A1 | 3/2014 | Noel et al. |
| 2014/0082715 | A1 | 3/2014 | Grajek et al. |
| 2014/0086146 | A1 | 3/2014 | Kim et al. |

(56) References Cited

U.S. PATENT DOCUMENTS

| | | |
|---|---|---|
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1* | 8/2014 | Goss .................. G06F 12/0246 711/103 |
| 2014/0230017 A1 | 8/2014 | Saib |
| 2014/0258526 A1 | 9/2014 | Le Sant et al. |
| 2014/0281315 A1* | 9/2014 | Danilak .............. G06F 11/1456 711/162 |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0081968 A1 | 3/2015 | LeMahieu et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0244559 A1 | 8/2015 | Sakthikumar et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0351590 A1* | 12/2017 | Davis .................. G06F 11/2094 |
| 2018/0032279 A1* | 2/2018 | Davis .................. G06F 3/0647 |

FOREIGN PATENT DOCUMENTS

| | | | |
|---|---|---|---|
| WO | WO 2012/087648 A1 | 6/2012 | |
| WO | WO2013071087 A1 | 5/2013 | |
| WO | WO 2014/110137 A1 | 7/2014 | |
| WO | WO 2016/015008 A1 | 12/2016 | |
| WO | WO 2016/190938 A1 | 12/2016 | |
| WO | WO 2016/195759 A1 | 12/2016 | |
| WO | WO 2016/195958 A1 | 12/2016 | |
| WO | WO 2016/195961 A1 | 12/2016 | |

OTHER PUBLICATIONS

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, *Using PCI Express as the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web.archive.org/web/20110526081214/http://www.webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Search Report and the Written Opinion received from the International Searching Authority (ISA/EPO) for International Application No. PCT/US2016/015006, dated Apr. 29, 2016, 12 pages.

The International Search Report and the Written Opinion received from the International Searching Authority (ISA/EPO) for International Application No. PCT/US2016/015008, dated May 4, 2016, 12 pages.

C. Hota et al., *Capability-based Cryptographic Data Access Control in Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [Accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Search Report and the Written Opinion received from the International Searching Authority (ISA/EPO) for International Application No. PCT/US2016/016333, dated Jun. 8, 2016, 12 pages.

(56) References Cited

OTHER PUBLICATIONS

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinion received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC6301B9/Hybrid_Identity_Datasheet.pdf> (online), published Apr. 2014, 17 pages.

Jacob Bellamy-Mcintyre et al., "OpenID and the Enterprise: A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinion received from the International Searching Authority (ISA/EPO) for International Application No. PCT/US2016/035492, dated Aug. 17, 2016, 10 pages.

International Search Report and the Written Opinion of the International Searching Authority in PCT/US2017/043993, dated Jul. 26, 2017; 10 pages.

\* cited by examiner

US 10,459,652 B2

EVACUATING BLADES IN A STORAGE ARRAY THAT INCLUDES A PLURALITY OF BLADES

CROSS-REFERENCE TO RELATED APPLICATION

The present application is a provisional conversion of and claims priority from U.S. Provisional Application No. 62/367,619, filed on Jul. 27, 2016, herein incorporated by reference.

DESCRIPTION OF EMBODIMENTS

Embodiments of the present disclosure relate to evacuating blades in a storage array that includes a plurality of blades. The storage arrays may provide persistent data storage through the use of one or more blades that may include compute resources (e.g., computer processors), storage resources (e.g., solid-state drives ('SSDs'), or any combination thereof. As the components of such blades age, the blades may not perform as well as they did when initially deployed. Furthermore, because technology is constantly advancing, as the blades age more efficient technologies may become available. As such, it may be desirable to replace aging blades with new blades.

Embodiments of the present disclosure may be useful in evacuating blades in a storage array that includes a plurality of blades by detecting an occurrence of a blade evacuation event associated with one or more blades. The blade evacuation event may indicate that the one or more blades should no longer be written to as the blades have been targeted for removal from the storage array. Readers will appreciate that one or more blades may be targeted for removal from the storage array for a variety of reasons. For example, the blades may utilize relatively old memory devices that have a smaller storage capacity than relatively new memory devices that may be available as replacements for the relatively old memory devices. Alternatively, the blades may utilize relatively old memory devices that have higher access latencies and can't perform as many IOPS as relatively new memory devices that may be available as replacements for the relatively old memory devices. For example, the blades may include DDR3 DRAM memory devices that can be replaced with DDR4 DRAM memory devices that operate at higher frequencies, lower power consumption levels, and so on. The one or more blades may therefore be targeted for removal from the storage array as part of an upgrade to the storage array. Readers will appreciate that the one or more blades may be targeted for removal from the storage array for other reasons, and readers will further appreciate that the one or more blades may be targeted for removal from the storage array in spite of the fact that the blades may still be properly functioning with no indication that a failure of the blades is imminent. Example embodiments of the present disclosure are further described with reference to the accompanying drawings, beginning with FIG. 1.

Figure 1:
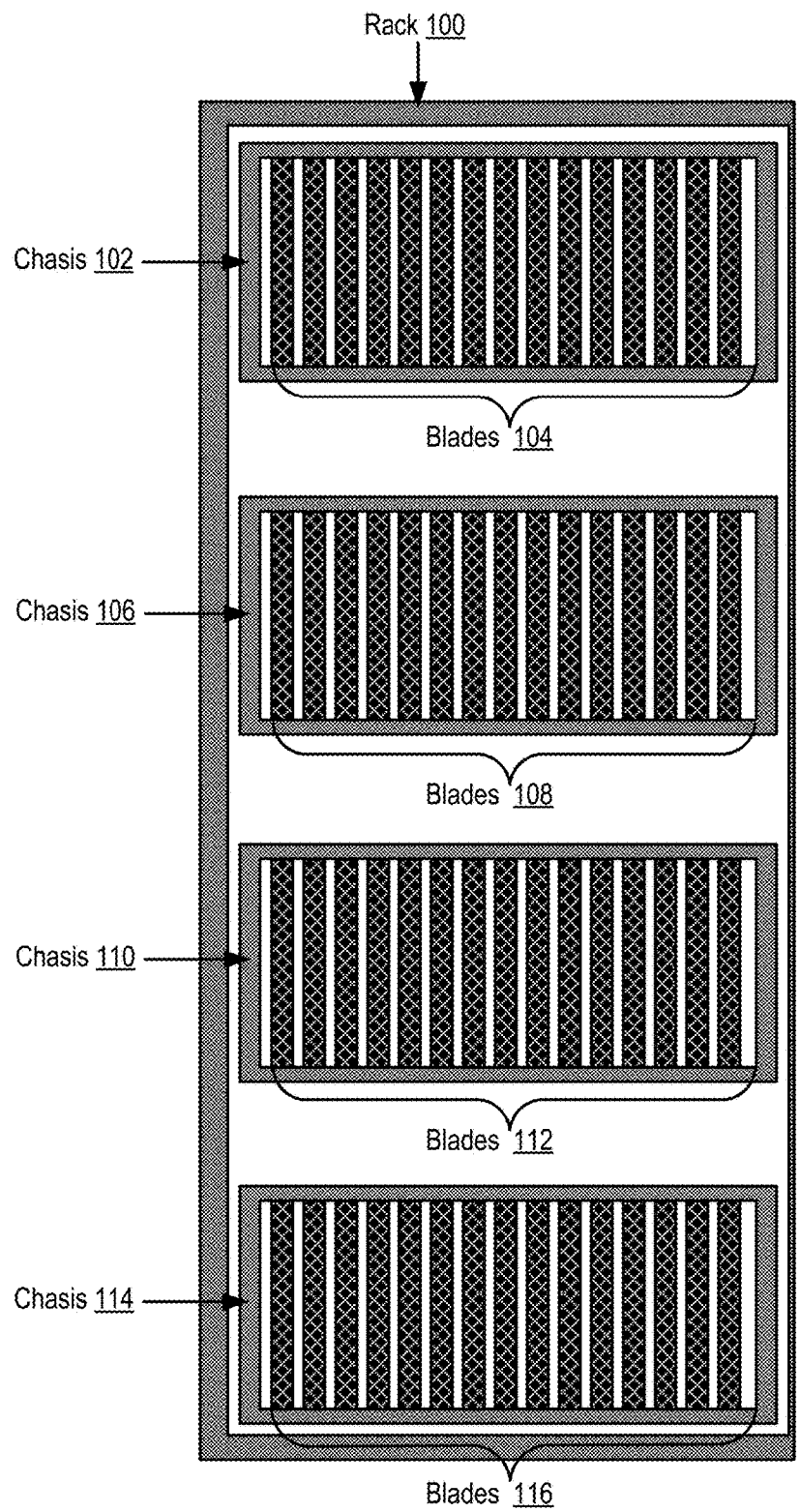
FIG. 1 sets forth a block diagram of a storage system configured for evacuating blades in a storage array that includes a plurality of blades according to embodiments of the present disclosure.

Example methods and apparatus for evacuating blades in a storage array that includes a plurality of blades in accordance with the present invention are described with reference to the accompanying drawings, beginning with FIG. 1. FIG. 1 sets forth a diagram of a storage system in which blades may be evacuated from a storage array that includes a plurality of blades according to embodiments of the present disclosure. The storage system of FIG. 1 includes a plurality of chassis (102, 106, 110, 114) mounted within a rack (100). The rack (100) depicted in FIG. 1 may be embodied as a standardized frame or enclosure for mounting multiple equipment modules, such as each of the chassis (102, 106, 110, 114) depicted in FIG. 1. The rack (100) may be embodied, for example, as a 19-inch rack that includes edges or ears that protrude on each side, thereby enabling a chassis (102, 106, 110, 114) or other module to be fastened to the rack (100) with screws or some other form of fastener. Readers will appreciate that while the storage system depicted in FIG. 1 includes a plurality of chassis (102, 106, 110, 114) mounted within a single rack (100), in other embodiments the plurality of chassis (102, 106, 110, 114) may be distributed across multiple racks. For example, a first chassis in the storage system may be mounted within a first rack, a second chassis in the storage system may be mounted within a second rack, and so on.

The chassis (102, 106, 110, 114) depicted in FIG. 1 may be embodied, for example, as passive elements that includes no logic. Each chassis (102, 106, 110, 114) may include a plurality of slots, where each slot is configured to receive a blade. Each chassis (102, 106, 110, 114) may also include a mechanism, such as a power distribution bus, that is utilized to provide power to each blade that is mounted within the chassis (102, 106, 110, 114). Each chassis (102, 106, 110, 114) may further include a communication mechanism, such as a communication bus, that enables communication between each blade that is mounted within the chassis (102, 106, 110, 114). The communication mechanism may be embodied, for example, as an Ethernet bus, Peripheral Component Interconnect Express ('PCIe') bus, InfiniBand bus, and so on. In some embodiments, each chassis (102, 106, 110, 114) may include at least two instances of both the power distribution mechanism and the communication mechanism, where each instance of the power distribution mechanism and each instance of the communication mechanism may be enabled or disabled independently.

Each chassis (102, 106, 110, 114) depicted in FIG. 1 may also include one or more ports for receiving an external communication bus that enables communication between multiple chassis (102, 106, 110, 114), directly or through a switch, as well as communications between a chassis (102, 106, 110, 114) and an external client system. The external communication bus may use a technology such as Ethernet, InfiniBand, Fibre Channel, and so on. In some embodiments, the external communication bus may use different communication bus technologies for inter-chassis communication than is used for communication with an external client system. In embodiments where one or more switches are deployed, each switch may act as a translation between multiple protocols or technologies. When multiple chassis (102, 106, 110, 114) are connected to define a storage cluster, the storage cluster may be accessed by a client using either proprietary interfaces or standard interfaces such as network file system ('NFS'), common internet file system ('CIFS'), small computer system interface ('SCSI'), hypertext transfer protocol ('HTTP'), and so on. Translation from the client protocol may occur at the switch, external communication bus, or within each blade.

Each chassis (102, 106, 110, 114) depicted in FIG. 1 houses fifteen blades (104, 108, 112, 116), although in other embodiments each chassis (102, 106, 110, 114) may house more or fewer blades. Each of the blades (104, 108, 112, 116) depicted in FIG. 1 may be embodied, for example, as a computing device that includes one or more computer processors, dynamic random access memory ('DRAM'), flash memory, interfaces for one more communication busses, interfaces for one or more power distribution busses, cooling components, and so on. Although the blades (104, 108, 112, 116) will be described in more detail below, readers will appreciate that the blades (104, 108, 112, 116) depicted in FIG. 1 may be embodied as different types of blades, such that the collective set of blades (104, 108, 112, 116) include heterogeneous members. Blades may be of different types as some blades (104, 108, 112, 116) may only provide processing resources to the overall storage system, some blades (104, 108, 112, 116) may only provide storage resources to the overall storage system, and some blades (104, 108, 112, 116) may provide both processing resources and storage resources to the overall storage system. Furthermore, even the blades (104, 108, 112, 116) that are identical in type may be different in terms of the amount of storage resources that the blades (104, 108, 112, 116) provide to the overall storage system. For example, a first blade that only provides storage resources to the overall storage system may provide 8 TB of storage while a second blade that only provides storage resources to the overall storage system may provide 256 TB of storage. The blades (104, 108, 112, 116) that are identical in type may also be different in terms of the amount of processing resources that the blades (104, 108, 112, 116) provide to the overall storage system. For example, a first blade that only provides processing resources to the overall storage system may include more processors or more powerful processors than a second blade that only provides processing resources to the overall storage system. Readers will appreciate that other differences may also exist between two individual blades and that blade uniformity is not required according to embodiments described herein.

Although not explicitly depicted in FIG. 1, each chassis (102, 106, 110, 114) may include one or more modules, data communications bus, or other apparatus that is used to identify which type of blade is inserted into a particular slot of the chassis (102, 106, 110, 114). In such an example, a management module may be configured to request information from each blade in each chassis (102, 106, 110, 114) when each blade is powered on, when the blade is inserted into a chassis (102, 106, 110, 114), or at some other time. The information received by the management module can include, for example, a special purpose identifier maintained by the blade that identifies the type (e.g., storage blade, compute blade, hybrid blade) of blade that has been inserted into the chassis (102, 106, 110, 114). In an alternative embodiment, each blade (102, 106, 110, 114) may be configured to automatically provide such information to a management module as part of a registration process.

In the example depicted in FIG. 1, the storage system may be initially configured by a management module that is executing remotely. The management module may be executing, for example, in a network switch control processor. Readers will appreciate that such a management module may be executing on any remote CPU and may be coupled to the storage system via one or more data communication networks. Alternatively, the management module may be executing locally as the management module may be executing on one or more of the blades (104, 108, 112, 116) in the storage system.

In the example depicted in FIG. 1, one or more of the blades (104, 108, 112, 116) may be used for evacuating blades in a storage array by: detecting an occurrence of a blade evacuation event associated with one or more blades; iteratively until migration has completed for each of the blades associated with the blade evacuation event: selecting, in dependence upon a blade redundancy policy, one or more next blades to be evacuated from the storage array; migrating, from the one or more next blades to one or more blades in the storage array that are not associated with the blade evacuation event, data stored on the next blade; and migrating, from the one or more next blades to one or more blades in the storage array that are not associated with the blade evacuation event, storage array computational workloads executing on the one or more next blades. One or more of the blades (104, 108, 112, 116) may be further used for evacuating blades in a storage array by: blocking write access to the blades associated with the blade evacuation event, copying, from the one or more next blades to one or more of the blades in the storage array that are not associated with the blade evacuation event, the data stored on the one or more next blades; initiating a garbage collection process on the one or more next blades, wherein the garbage collection process identifies valid data stored on the one or more next blades and invalid data stored on the one or more next blades; writing the valid data identified by the garbage collection process to the one or more blades in the storage array that are not associated with the blade evacuation event; rebuilding the data stored on the one or more next blades utilizing redundancy data stored in the storage array; identifying authorities executing on the one or more next blades;

initiating, on one or more of the blades in the storage array that are not associated with the blade evacuation event, execution of the authorities; ceasing execution of the authorities on the one or more next blades; receiving a user-initiated request to evacuate the blades associated with the blade evacuation event; and erasing the data stored on the blades associated with the blade evacuation event; and presenting an indication that migration has completed for one or more of the blades associated with the blade evacuation event, as will be described in greater detail below. Readers will appreciate that while in some embodiments one or more of the blades (104, 108, 112, 116) may be used for evacuating blades in a storage array by carrying out the steps listed above, in alternative embodiments, another apparatus that includes at least computer memory and a computer processor may be used for evacuating blades in a storage array by carrying out the steps listed above.

Figure 2:
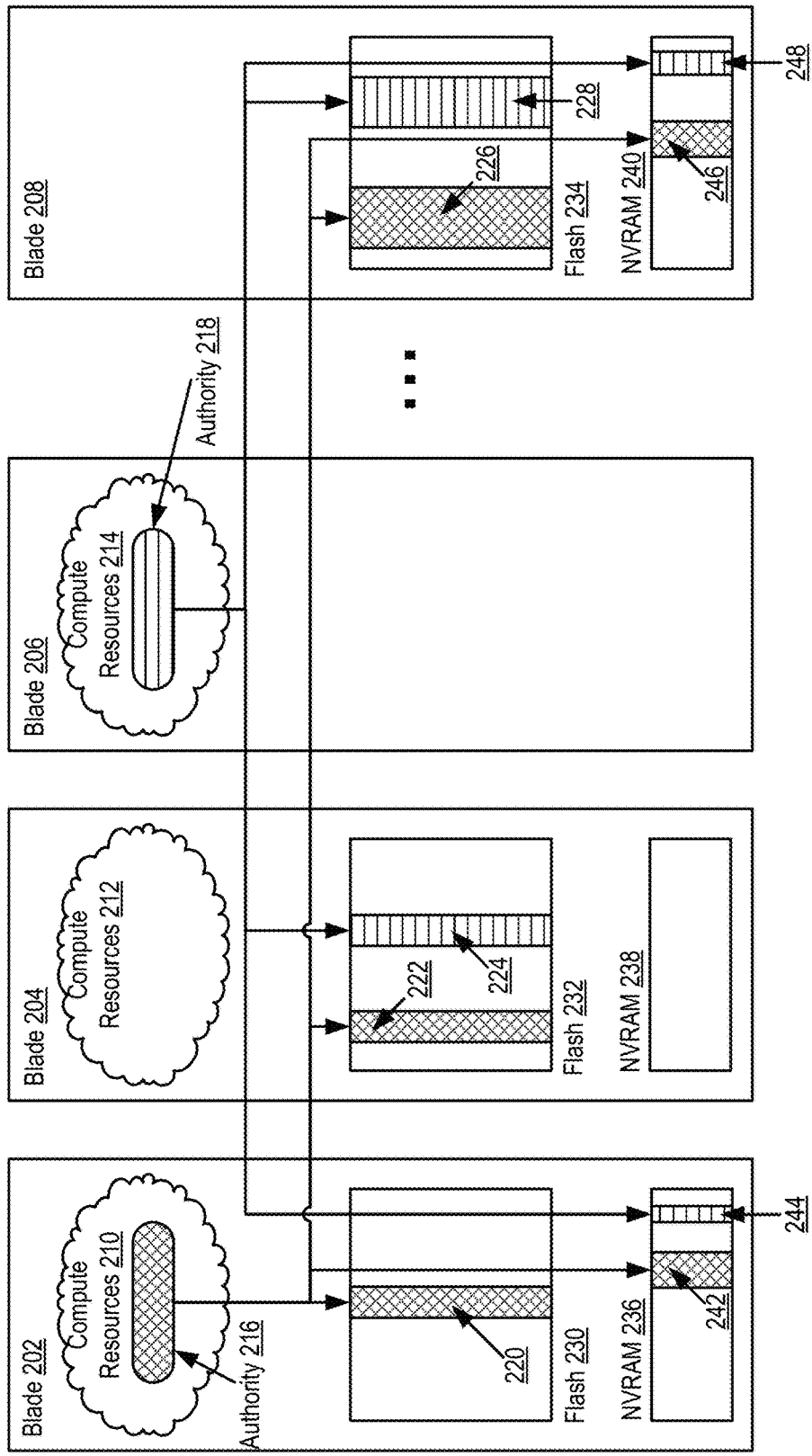
FIG. 2 sets forth a diagram of a set of blades useful in evacuating blades in a storage array according to embodiments of the present disclosure.

For further explanation, FIG. 2 sets forth a diagram of a set of blades (202, 204, 206, 208) useful in evacuating blades in a storage array according to embodiments of the present disclosure. Although blades will be described in greater detail below, the blades (202, 204, 206, 208) depicted in FIG. 2 may include compute resources (210, 212, 214), storage resources in the form of flash memory (230, 232, 234), storage resources in the form of non-volatile random access memory ('NVRAM') (236, 238, 240), or any combination thereof. In the example depicted in FIG. 2, the blades (202, 204, 206, 208) are of differing types. For example, one blade (206) includes only compute resources (214), another blade (208) includes only storage resources, depicted here as flash (234) memory and NVRAM (240), and two of the blades (202, 204) include compute resources (210, 212) as well as storage resources in the form of flash (230, 232) memory and NVRAM (236, 238). In such of an example, the blade (206) that includes only compute resources (214) may be referred to as a compute blade, the blade (208) that includes only storage resources may be referred to as a storage blade, and the blades (202, 204) that include both compute resources (210, 212) and storage resources may be referred to as a hybrid blade.

The compute resources (210, 212, 214) depicted in FIG. 2 may be embodied, for example, as one or more computer processors, as well as memory that is utilized by the computer processor but not included as part of general storage within the storage system. The compute resources (210, 212, 214) may be coupled for data communication with other blades and with external client systems, for example, via one or more data communication busses that are coupled to the compute resources (210, 212, 214) via one or more data communication adapters.

The flash memory (230, 232, 234) depicted in FIG. 2 may be embodied, for example, as multiple flash dies which may be referred to as packages of flash dies or an array of flash dies. Such flash dies may be packaged in any number of ways, with a single die per package, multiple dies per package, in hybrid packages, as bare dies on a printed circuit board or other substrate, as encapsulated dies, and so on. Although not illustrated in FIG. 2, an input output (I/O) port may be coupled to the flash dies and a direct memory access ('DMA') unit may also be coupled directly or indirectly to the flash dies. Such components may be implemented, for example, on a programmable logic device ('PLD') such as a field programmable gate array ('FPGA'). The flash memory (230, 232, 234) depicted in FIG. 2 may be organized as pages of a predetermined size, blocks that include a predetermined number of pages, and so on.

The NVRAM (236, 238, 240) depicted in FIG. 2 may be embodied, for example, as one or more non-volatile dual in-line memory modules ('NVDIMMs'), as one more DRAM dual in-line memory modules ('DIMMs') that receive primary power through a DIMM slot but are also attached to a backup power source such as a supercapacitor, and so on. The NVRAM (236, 238, 240) depicted in FIG. 2 may be utilized as a memory buffer for temporarily storing data that will be written to flash memory (230, 232, 234), as writing data to the NVRAM (236, 238, 240) may be carried out more quickly than writing data to flash memory (230, 232, 234). In this way, the latency of write requests may be significantly improved relative to a system in which data is written directly to the flash memory (230, 232, 234).

In the example method depicted in FIG. 2, a first blade (202) includes a first authority (216) that is executing on the compute resources (210) within the first blade (202) and a second blade (206) includes a second authority (218) that is executing on the compute resources (214) within the second blade (206). Each authority (216, 218) represents a logical partition of control and may be embodied as a module of software executing on the compute resources (210, 212, 214) of a particular blade (202, 204, 206). Each authority (216, 218) may be configured to control how and where data is stored in storage system. For example, authorities (216, 218) may assist in determining which type of erasure coding scheme is applied to the data, authorities (216, 218) may assist in determining where one or more portions of the data may be stored in the storage system, and so on. Each authority (216, 218) may control a range of inode numbers, segment numbers, or other data identifiers which are assigned to data by a file system or some other entity.

Readers will appreciate that every piece of data and every piece of metadata stored in the storage system is owned by a particular authority (216, 218). Each authority (216, 218) may cause data that is owned by the authority (216, 218) to be stored within storage that is located within the same blade whose computing resources are supporting the authority (216, 218) or within storage that is located on some other blade. For example, the authority (216) that is executing on the compute resources (210) within a first blade (202) has caused data to be stored within a portion (220) of flash (230) and a portion (242) of NVRAM (236) that is physically located within the first blade (202), The authority (216) that is executing on the compute resources (210) within the first blade (202) has also caused data to be stored within a portion (222) of flash (232) on the second blade (204) in the storage system as well as a portion (226) of flash (234) and a portion (246) of NVRAM (240) on the fourth blade (208) in the storage system. Likewise, the authority (218) that is executing on the compute resources (214) within the third blade (202) has caused data to be stored within a portion (244) of NVRAM (236) that is physically located within the first blade (202), within a portion (224) of flash (232) within the second blade (204), within a portion (228) of flash (234) within the fourth blade (208), and within a portion (248) of NVRAM (240) within the fourth blade (208).

Readers will appreciate that many embodiments other than the embodiment depicted in FIG. 2 are contemplated as it relates to the relationship between data, authorities, and system components. In some embodiments, every piece of data and every piece of metadata has redundancy in the storage system. In some embodiments, the owner of a particular piece of data or a particular piece of metadata may be a ward, with an authority being a group or set of wards. Likewise, in some embodiments there are redundant copies of authorities. In some embodiments, authorities have a relationship to blades and the storage resources contained therein. For example, each authority may cover a range of data segment numbers or other identifiers of the data and each authority may be assigned to a specific storage resource. Data may be stored in a segment according to some embodiments of the present disclosure, and such segments may be associated with a segment number which serves as indirection for a configuration of a Redundant Array of Independent Drives ('RAID') stripe. A segment may identify a set of storage resources and a local identifier into the set of storage resources that may contain data. In some embodiments, the local identifier may be an offset into a storage device and may be reused sequentially by multiple segments. In other embodiments the local identifier may be unique for a specific segment and never reused. The offsets in the storage device may be applied to locating data for writing to or reading from the storage device.

Readers will appreciate that if there is a change in where a particular segment of data is located (e.g., during a data move or a data reconstruction), the authority for that data segment should be consulted. In order to locate a particular piece of data, a hash value for a data segment may be calculated, an inode number may be applied, a data segment number may be applied, and so on. The output of such an operation can point to a storage resource for the particular piece of data. In some embodiments the operation described above may be carried out in two stages. The first stage maps an entity identifier (ID) such as a segment number, an inode number, an object ID, or directory number to an authority identifier. This mapping may include a calculation such as a hash or a bit mask. The second stage maps the authority identifier to a particular storage resource, which may be done through an explicit mapping. The operation may be repeatable, so that when the calculation is performed, the result of the calculation reliably points to a particular storage resource. The operation may take the set of reachable storage resources as input, and if the set of reachable storage resources changes, the optimal set changes. In some embodiments, a persisted value represents the current assignment and the calculated value represents the target assignment the cluster will attempt to reconfigure towards.

The compute resources (210, 212, 214) within the blades (202, 204, 206) may be tasked with breaking up data to be written to storage resources in the storage system. When data is to be written to a storage resource, the authority for that data is located as described above. When the segment ID for data is already determined, the request to write the data is forwarded to the blade that is hosting the authority, as determined using the segment ID. The computing resources on such a blade may be utilized to break up the data and transmit the data for writing to a storage resource, at which point the transmitted data may be written as a data stripe in accordance with an erasure coding scheme. In some embodiments, data is requested to be pulled and in other embodiments data is pushed. When compute resources (210, 212, 214) within the blades (202, 204, 206) are tasked with reassembling data read from storage resources in the storage system, the authority for the segment ID containing the data is located as described above.

The compute resources (210, 212, 214) within the blades (202, 204, 206) may also be tasked with reassembling data read from storage resources in the storage system. The compute resources (210, 212, 214) that support the authority that owns the data may request the data from the appropriate storage resource. In some embodiments, the data may be read from flash storage as a data stripe. The compute resources (210, 212, 214) that support the authority that owns the data may be utilized to reassemble the read data, including correcting any errors according to the appropriate erasure coding scheme, and forward the reassembled data to the network. In other embodiments, breaking up and reassembling data, or some portion thereof, may be performed by the storage resources themselves.

The preceding paragraphs discuss the concept of a segment. A segment may represent a logical container of data in accordance with some embodiments. A segment may be embodied, for example, as an address space between a medium address space and physical flash locations. Segments may also contain metadata that enables data redundancy to be restored (rewritten to different flash locations or devices) without the involvement of higher level software. In some embodiments, an internal format of a segment contains client data and medium mappings to determine the position of that data. Each data segment may be protected from memory and other failures, for example, by breaking the segment into a number of data and parity shards. The data and parity shards may be distributed by striping the shards across storage resources in accordance with an erasure coding scheme.

Figure 3:
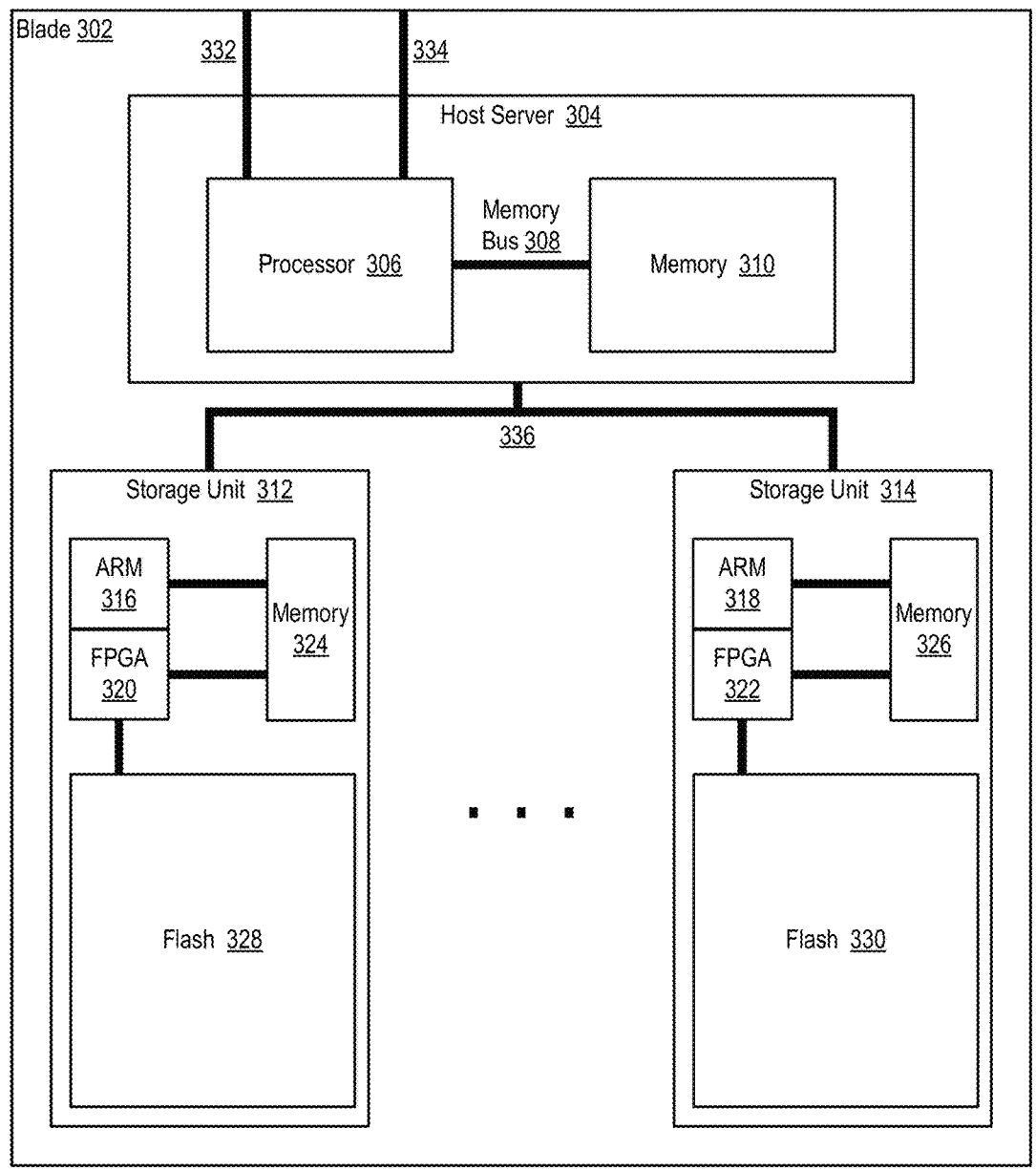
FIG. 3 sets forth a diagram of a blade useful in evacuating blades in a storage array according to embodiments of the present disclosure.

For further explanation, FIG. 3 sets forth a diagram of a blade (302) useful in evacuating blades in a storage array according to embodiments of the present disclosure. As described above, the storage system may include storage blades, compute blades, hybrid blades, or any combination thereof. The example depicted in FIG. 3 represents an embodiment of a hybrid blade as the blade (302) includes both compute resources and storage resources.

The compute resources in the blade (302) depicted in FIG. 3 includes a host server (304) that includes a computer processor (306) coupled to memory (310) via a memory bus (308). The computer processor (306) depicted in FIG. 3 may be embodied, for example, as a central processing unit ('CPU') or other form of electronic circuitry configured to execute computer program instructions. The computer processor (306) may utilize the memory (310) to store data or other information useful during the execution of computer program instructions by the computer processor (306). Such memory (310) may be embodied, for example, as DRAM that is utilized by the computer processor (306) to store information when the computer processor (306) is performing computational tasks such as creating and sending I/O operations to one of the storage units (312, 314), breaking up data, reassembling data, and other tasks.

In the example depicted in FIG. 3, the computer processor (306) is coupled to two data communication links (332, 334). Such data communications links (332, 334) may be embodied, for example, as Ethernet links that are coupled to a data communication network via a network adapter. The computer processor (306) may receive input/output operations that are directed to the attached storage units (312, 314), such as requests to read data from the attached storage units (312, 314) or requests to write data to the attached storage units (312, 314).

The blade (302) depicted in FIG. 3 also includes storage resources in the form of one or more storage units (312, 314). Each storage unit (312, 314) may include flash (328, 330) memory as well as other forms of memory (324, 326), such as the NVRAM discussed above. In the example depicted in FIG. 3, the storage units (312, 314) may include integrated circuits such as a field-programmable gate array ('FPGA') (320, 322), microprocessors such as an Advanced RISC Machine ('ARM') microprocessor that are utilized to write data to and read data from the flash (328, 330) memory as well as the other forms of memory (324, 326) in the storage unit (312, 314), or any other form of computer processor. The FPGAs (320, 322) and the ARM (316, 318) microprocessors may, in some embodiments, perform operations other than strict memory accesses. For example, in some embodiments the FPGAs (320, 322) and the ARM (316, 318) microprocessors may break up data, reassemble data, and so on. In the example depicted in FIG. 3, the computer processor (306) may access the storage units (312, 314) via a data communication bus (336) such as a PCIe bus.

Readers will appreciate that a compute blade may be similar to the blade (302) depicted in FIG. 3 as the compute blade may include one or more host servers that are similar to the host server (304) depicted in FIG. 3. Such a compute blade may be different than the blade (302) depicted in FIG. 3, however, as the compute blade may lack the storage units (312, 314) depicted in FIG. 3. Readers will further appreciate that a storage blade may be similar to the blade (302) depicted in FIG. 3 as the storage blade may include one or more storage units that are similar to the storage units (312, 314) depicted in FIG. 3. Such a storage blade may be different than the blade (302) depicted in FIG. 3, however, as the storage blade may lack the host server (304) depicted in FIG. 3. The example blade (302) depicted in FIG. 3 is included only for explanatory purposes. In other embodiments, the blades may include additional processors, additional storage units, compute resources that are packaged in a different manner, storage resources that are packaged in a different manner, and so on.

Figure 4:
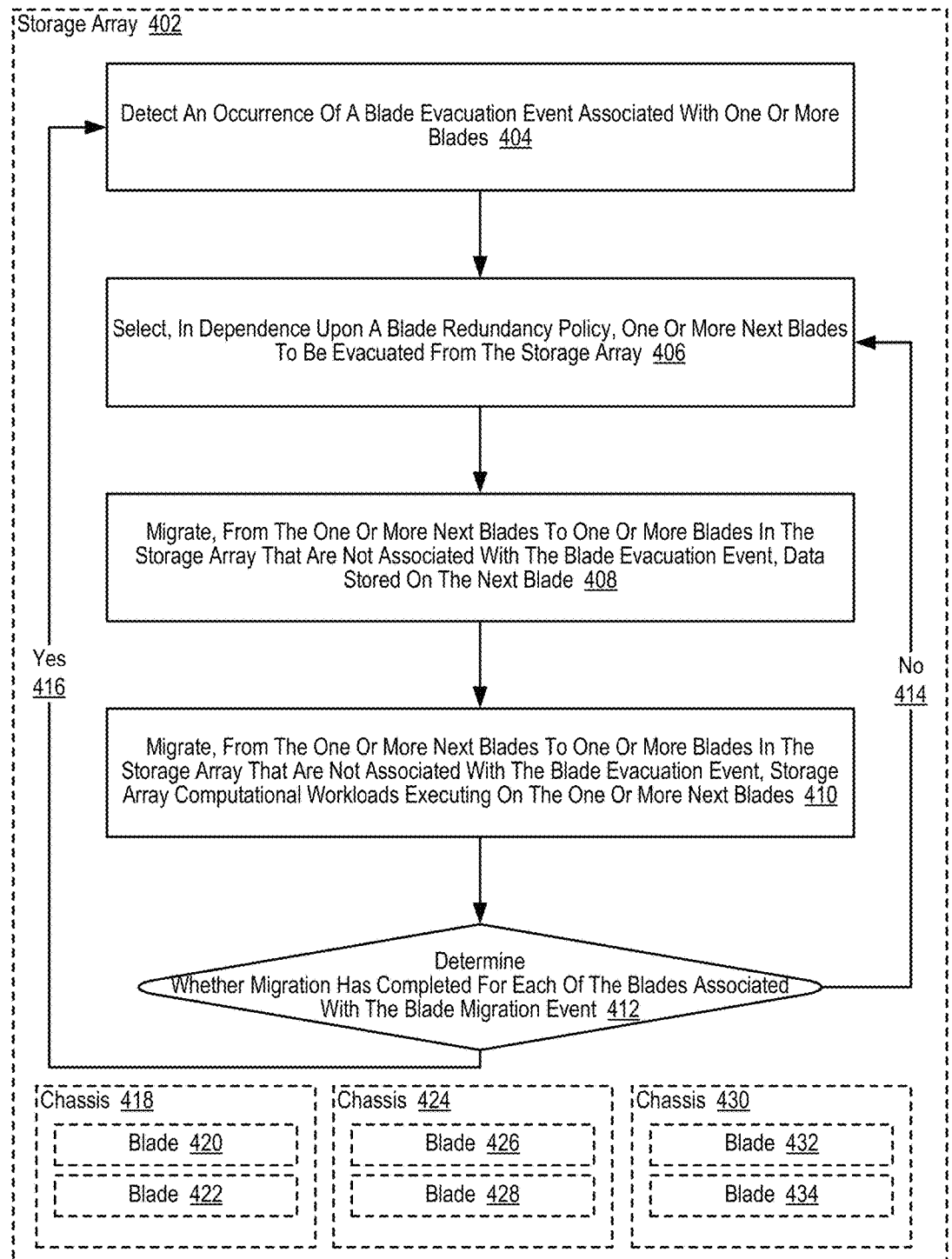
FIG. 4 sets forth a flow chart illustrating an example method of evacuating blades in a storage array that includes a plurality of blades according to embodiments of the present disclosure.

For further explanation, FIG. 4 sets forth a flow chart illustrating an example method of evacuating blades in a storage array (402) that includes a plurality of blades (420, 422, 426, 428, 432, 434) according to embodiments of the present disclosure. The storage array (402) depicted in FIG. 4 may be similar to the storage arrays described above, as the storage array (402) can include a plurality of blades (420, 422, 426, 428, 432, 434) that are mounted within chassis (418, 424, 430).

The example method depicted in FIG. 4 can include detecting (404) an occurrence of a blade evacuation event associated with one or more blades. A blade evacuation event may indicate that the one or more blades (420, 422, 426, 428, 432, 434) should no longer be written to as the blades (420, 422, 426, 428, 432, 434) will ultimately be removed from the storage array (402). A blade evacuation event may also indicate that any workloads executing on the one or more blades (420, 422, 426, 428, 432, 434) should be relocated as the blades (420, 422, 426, 428, 432, 434) will ultimately be removed from the storage array (402). Before the blades (420, 422, 426, 428, 432, 434) are removed from the storage array (402), however, valid data on the blades (420, 422, 426, 428, 432, 434) and workloads executing on the blades (420, 422, 426, 428, 432, 434) should be relocated to other blades (420, 422, 426, 428, 432, 434) in the storage array (402). The blade evacuation event may be embodied, for example, as an event that is generated in response to a system administrator or other administrative entity indicating that the one or more blades (420, 422, 426, 428, 432, 434) are designated for removal from the storage array (402). The system administrator or other administrative entity may indicate that the one or more blades (420, 422, 426, 428, 432, 434) are designated for removal from the storage array (402), for example, through the use of a special purpose user interface (e.g., a GUI presented on a display screen) that presents an inventory of the blades (420, 422, 426, 428, 432, 434) that are included in the storage array (402) and that also allowed the user of the special purpose user interface to select one or more blades (420, 422, 426, 428, 432, 434) that are to be designated for removal from the storage array (402).

In the example method depicted in FIG. 4, detecting (404) an occurrence of a blade evacuation event associated with one or more blades (420, 422, 426, 428, 432, 434) may be carried out by a special purpose module of computer program instructions that is executing on computer hardware within the storage array (402). Such a special purpose module of computer program instructions may be a stand-alone module or may be included within a larger module such as, for example, the blade evacuation module described below with reference to FIG. 11. Such a special purpose module of computer program instructions may be executing, for example, on one or more computer processors within an array management server, on one or more computer processors within a storage array controller that is similar to the storage array controllers described above, or on other computer hardware within the storage array (402).

Readers will appreciate that one or more blades (420, 422, 426, 428, 432, 434) may be designated for removal from the storage array (402) for a variety of reasons. For example, the one or more blades (420, 422, 426, 428, 432, 434) that are designated for removal from the storage array (402) may be relatively old blades that have a smaller storage capacity than relatively new blades that may be available as replacements for the relatively old blades. Alternatively, the blades (420, 422, 426, 428, 432, 434) that are designated for removal from the storage array (402) may be relatively old blades that have higher access latencies and can't perform as many IOPS as relatively new blades that may be available as replacements for the relatively old blades. Likewise, the blades (420, 422, 426, 428, 432, 434) that are designated for removal from the storage array (402) may be relatively old blades that have less processing power (e.g., fewer CPUs, slower CPUs, and so on) as relatively new blades that may be available as replacements for the relatively old blades. The one or more blades (420, 422, 426, 428, 432, 434) that are designated for removal from the storage array (402) may be designated for removal from the storage array (402) as part of an upgrade to the storage array (402). Readers will appreciate that the blades (420, 422, 426, 428, 432, 434) that are designated for removal from the storage array (402) may be designated for removal from the storage array (402) for other reasons, and readers will further appreciate that the blades (420, 422, 426, 428, 432, 434) that are designated for removal from the storage array (402) may be designated for removal from the storage array (402) in spite of the fact that the blades (420, 422, 426, 428, 432, 434) that are designated for removal from the storage array (402) may still be properly functioning with no indication that a failure of the blades (420, 422, 426, 428, 432, 434) that are designated for removal from the storage array (402) is imminent.

The example method depicted in FIG. 4 can also include selecting (406) one or more next blades to be evacuated from the storage array (402). The one or more next blades to be evacuated from the storage array (402) represent at least a portion of the blades that are associated with the blade evacuation event. The next blades to be evacuated from the storage array (402) are the next blades that will be evacuated from the storage array (402). Consider an example in which three blades (420, 428, 434) are associated with the blade evacuation event, indicating that the three blades (420, 428, 434) will eventually be removed from the storage array (402). In such an example, however, assume that the storage array (402) can only tolerate the loss of two blades at any given point in time without losing data stored in the storage array (402). Because the storage array (402) can only tolerate the loss of two blades at any given point in time without losing data stored in the storage array (402), it may be undesirable to effectively treat all three blades (420, 428, 434) as if they are unavailable. In addition, the amount of work required to migrate all of the data stored on all three blades (420, 428, 434) and the amount of work required to relocate all of the computational workloads executing on all three blades (420, 428, 434) at one time may negatively impair the ability of the storage array (402) to service I/O requests. As such, a staggered decommissioning of the three blades (420, 428, 434) associated with the blade evacuation event may be accomplished by selecting (406) a number of blades that will not cause data to be lost as the one or more next blades to be evacuated from the storage array (402). For example, a first blade (420) associated with the blade evacuation event may be selected (406) as the next blade to be evacuated from the storage array (402), a second blade (428) associated with the blade evacuation event may be selected (406) as the next blade to be evacuated from the storage array (402) only after the first blade (420) has been evacuated, and a third blade (434) associated with the blade evacuation event may be selected (406) as the next blade to be evacuated from the storage array (402) only after the second blade (428) has been evacuated.

Readers will appreciate that selecting (406) one or more next blades to be evacuated from the storage array (402) may be carried out in dependence upon a blade redundancy policy. The blade redundancy policy may include, for example, information describing the maximum number of blades that may be lost without resulting in a loss of data stored on the storage array (402). For example, some storage arrays may include a sufficient amount of redundancy data that two blades in the storage array (402) may be lost (e.g., by failing, by being removed from the storage array, and so on) without resulting in a loss of data stored on the storage array (402), as the data stored on the two lost blades may be rebuilt using redundancy data and data stored on blades in the storage array (402) that were not lost by performing RAID or RAID-like data redundancy operations. In such an example, the number of the one or more next blades selected to be evacuated from the storage array (402) may be less than the maximum number of blades that may be lost without resulting in the loss of data stored on the storage array (402). Readers will appreciate that in alternative embodiments, selecting (406) one or more next blades to be evacuated from the storage array (402) may be carried out in dependence upon other considerations such as, for example, an amount of processing resources that are to be allocated for relocating data stored on and processing workloads executing on blades that are associated with the blade evacuation event, an amount of I/O requests that are being directed to the storage array (402) as more resources may be dedicated to relocating data stored on and processing workloads executing on blades that are associated with the blade evacuation event during periods of low I/O activity, and so on.

The example method depicted in FIG. 4 can also include migrating (408), from the one or more next blades to one or more blades in the storage array that are not associated with the blade evacuation event, data stored on the one or more next blades. Migrating (408) the data stored on the one or more next blades to one or more blades in the storage array (402) that are not associated with the blade evacuation event may be carried out, for example, by writing the data stored on the one or more next blades to be evacuated from the storage array (402) to the one or more blades in the storage array (402) that are not associated with the blade evacuation event. Continuing with the example described above where three blades (420, 428, 434) are associated with the blade evacuation event and a first blade (420) associated with the blade evacuation event is selected (406) as the one or more next blades to be evacuated from the storage array (402), data stored on the first blade (420) may be migrated (408) to one or more of the blades (422, 426, 432) that are not associated with the blade evacuation event.

Readers will appreciate that if there is not sufficient space on the blades (422, 426, 432) that are not associated with the blade evacuation event to store the data stored on the first blade (420), migration (408) of the data may be aborted and the storage array (402) may be rolled back to its state prior to the occurrence of the blade evacuation event. In such an example, an array operating environment executing on a storage array controller may determine that insufficient space exists on the blades (422, 426, 432) that are not associated with the blade evacuation event if storing the data stored on the first blade (420) would cause the capacity utilization of the blades (422, 426, 432) that are not associated with the blade evacuation event to exceed a predetermined threshold.

Readers will appreciate that in some embodiments, only the valid data that is stored on the one or more next blades to be evacuated from the storage array (402) will be migrated (408) to the blades (422, 426, 432) that are not associated with the blade evacuation event, as invalid data does not need to be retained by migrating (408) such invalid data to the blades (422, 426, 432) that are not associated with the blade evacuation event. Consider an example in which a particular piece of data was stored at a first location within one of the next blades to be evacuated from the storage array (402). In such an example, assume that a request to modify the particular piece of data was subsequently received. In view of the fact that the storage devices within the blades (420, 422, 426, 428, 432, 434) may be embodied as an SSD, modifying the particular piece of data cannot be accomplished by simply overwriting the data as would occur in a hard disk drive. Instead, the modified version of the particular piece of data would be written to a second location (which may or may not be on the same blade) and the particular piece of data that was stored at the first location within one of the next blades to be evacuated from the storage array (402) would be marked as being invalid. As such, the one or more next blades to be evacuated from the storage array (402) may include some invalid data that has not yet been garbage collected, and such invalid data does not need to be retained by migrating (408) the invalid data to the blades (422, 426, 432) that are not associated with the blade evacuation event.

In an alternative embodiment, migrating (408) the data stored on the one or more next blades to one or more blades in the storage array (402) that are not associated with the blade evacuation event can include initiating a garbage collection process on the one or more next blades to be evacuated from the storage array (402). A garbage collection process may be embodied, for example, as a module of computer program instructions executing on computer hardware such as a computer processor or a microcontroller. The garbage collection process may be configured to reclaim memory that is occupied by data that is no longer in use. As described above, data that is no longer in use may be referred to herein as invalid data whereas data that is still in use may be referred to herein as valid data.

In the example method depicted in FIG. 4, the garbage collection process may identify valid data stored on the one or more next blades to be evacuated from the storage array (402) and the garbage collection process can also identify invalid data on the one or more next blades to be evacuated from the storage array (402). The garbage collection process may identify valid data stored on the one or more next blades to be evacuated from the storage array (402) and the garbage collection process can also identify invalid data stored on the one or more next blades to be evacuated from the storage array (402), for example, by reading metadata that is associated with data stored in the storage array (402). Such metadata can include information that can be used to determine whether a particular piece of data is valid or invalid. The metadata may include such information as the result of steps carried out when data is written to the blades (420, 422, 426, 428, 432, 434).

Consider an example in which the storage devices within the blades (420, 422, 426, 428, 432, 434) are embodied as SSDs where data is written to the SSDs in 16 KB pages. Attached to each page in the SSD may be a small amount (e.g., 8 Bytes) of additional memory that is used to store metadata associated with the page. The SSDs may be configured to receive requests to write data from a storage array controller or other device, where the requests to write data include a virtual address that the SSD subsequently translates into a physical address. In such an example, the virtual-to-physical address translations may be stored by the SSD in a translation table that is maintained by the SSD. When the SSD receives a request to write data to a particular virtual address, the SSD may write the data to a first page that is associated with a first physical address and the SSD may also set a predetermined bit in the small amount of additional memory that is used to store metadata associated with the first page to a value indicating that the data contained therein is valid. If the SSD subsequently receives a second request to write data to the particular virtual address, the SSD may write the data to a second page that is described by a second physical address and also set a predetermined bit in the small amount of additional memory that is used to store metadata associated with the second page to a value indicating that the data contained therein is valid. In addition, the SSD may set the predetermined bit in the small amount of additional memory that is used to store metadata associated with the first page to a value indicating that the data contained therein is invalid, while also updating the translation table to map the particular virtual address to the second physical address. In such a way, the garbage collection process may scan the metadata associated with each page to determine whether the contents of each page are valid or invalid. Readers will appreciate that in other embodiments, metadata that is associated with data stored in the storage array (402) may be stored and maintained in other ways. In the example method depicted in FIG. 4, migrating (408) the data stored on the one or more next blades to one or more blades in the storage array (402) that are not associated with the blade evacuation event can be carried out by writing the valid data identified by the garbage collection process to the one or more blades in the storage array (402) that are not associated with the blade evacuation event.

In another alternative embodiment, migrating (408) the data stored on the one or more next blades to one or more blades in the storage array (402) that are not associated with the blade evacuation event can include rebuilding the data stored on the one or more next blades to be evacuated from the storage array (402) using RAID or RAID-like operations. In such an example, at least a portion of the data stored on the blades associated with the blade evacuation event may be part of a data set that is striped across a plurality of blades. As such, redundancy data and/or data stored on blades other than the one or more next blades to be evacuated from the storage array (402) may be used to reconstruct the data stored on the one or more next blades to be evacuated from the storage array (402). In such an example, the reconstructed data may be stored on the one or more blades in the storage array (402) that are not associated with the blade evacuation event.

The example method depicted in FIG. 4 can also include migrating (410), from the one or more next blades to one or more blades in the storage array (402) that are not associated with the blade evacuation event, storage array computational workloads executing on the one or more next blades. In the example method depicted in FIG. 4, migrating (410) storage array computational workloads executing on the one or more next blades to one or more blades in the storage array (402) that are not associated with the blade evacuation event may be carried out, for example, by copying the source code for the computational workloads executing on the one or more next blades to one or more blades in the storage array (402) that are not associated with the blade evacuation event and initiating execution of such source code on the blades in the storage array (402) that are not associated with the blade evacuation event. In such an example, once all valid data stored on the one or more next blades to be evacuated from the storage array (402) has been migrated (408) to the blades in the storage array (402) that are not associated with the blade evacuation event and once all storage array computational workloads executing on the one or more next blades has been migrated (410) to one or more blades in the storage array (402) that are not associated with the blade evacuation event, the one or more next blades to be evacuated from the storage array (402) may be safely removed from the storage array (402). After the one or more next blades to be evacuated from the storage array (402) have been removed from the storage array (402), a new blade may be inserted in its place and the new blade may be added to the storage array (402) through a registration process that may be carried out, for example, by an array operating environment that is executing on a storage array (402). Such a registration process can be carried out by detecting the insertion of a blade into the storage array (402) and initializing the inserted blade. In such an example, detecting the insertion of a blade into the storage array (402) may be carried out through the use of software detection mechanisms or hardware components (e.g., presence detect lines) that detect the physical presence of a device and signal a storage array controller or similar device when a blade is inserted or removed from the storage array (402).

Readers will appreciate that in the example method depicted in FIG. 4, the steps of selecting (402) one or more next blades to be evacuated from the storage array, migrating (408) data stored on one or more of the next blades to one or more blades in the storage array (402) that are not associated with the blade evacuation event, and migrating storage array computational workloads executing on one or more of the next blades to one or more blades in the storage array (402) that are not associated with the blade evacuation event may be performed iteratively until migration has completed for each of the blades associated with the blade evacuation event. Continuing with the example described above where three blades (420, 428, 434) are associated with the blade evacuation event and a first blade (420) associated with the blade evacuation event is selected (406) as the one or more next blades to be evacuated from the storage array (402), once all data stored on the first blade (420) has been migrated (408) and once all computational workloads executing on the first blade (420) have been migrated (410), the storage array (402) may continue by continuing the migration process for one or more of the other blades (428, 434) that are associated with the blade evacuation event. To that end, the storage array (402) may determine (412) whether migration has completed for each of the blades associated with the blade migration event. If the storage array (402) determines that migration has not (414) completed for each of the blades associated with the blade migration event, the storage array (402) may proceed by selecting (406) one or more next blades to be evacuated from the storage array (402). If the storage array (402) affirmatively (416) determines that migration has completed for each of the blades associated with the blade migration event, however, the storage array (402) may proceed by waiting to detect (404) an occurrence of a new blade evacuation event associated with one or more blades.

Figure 5:
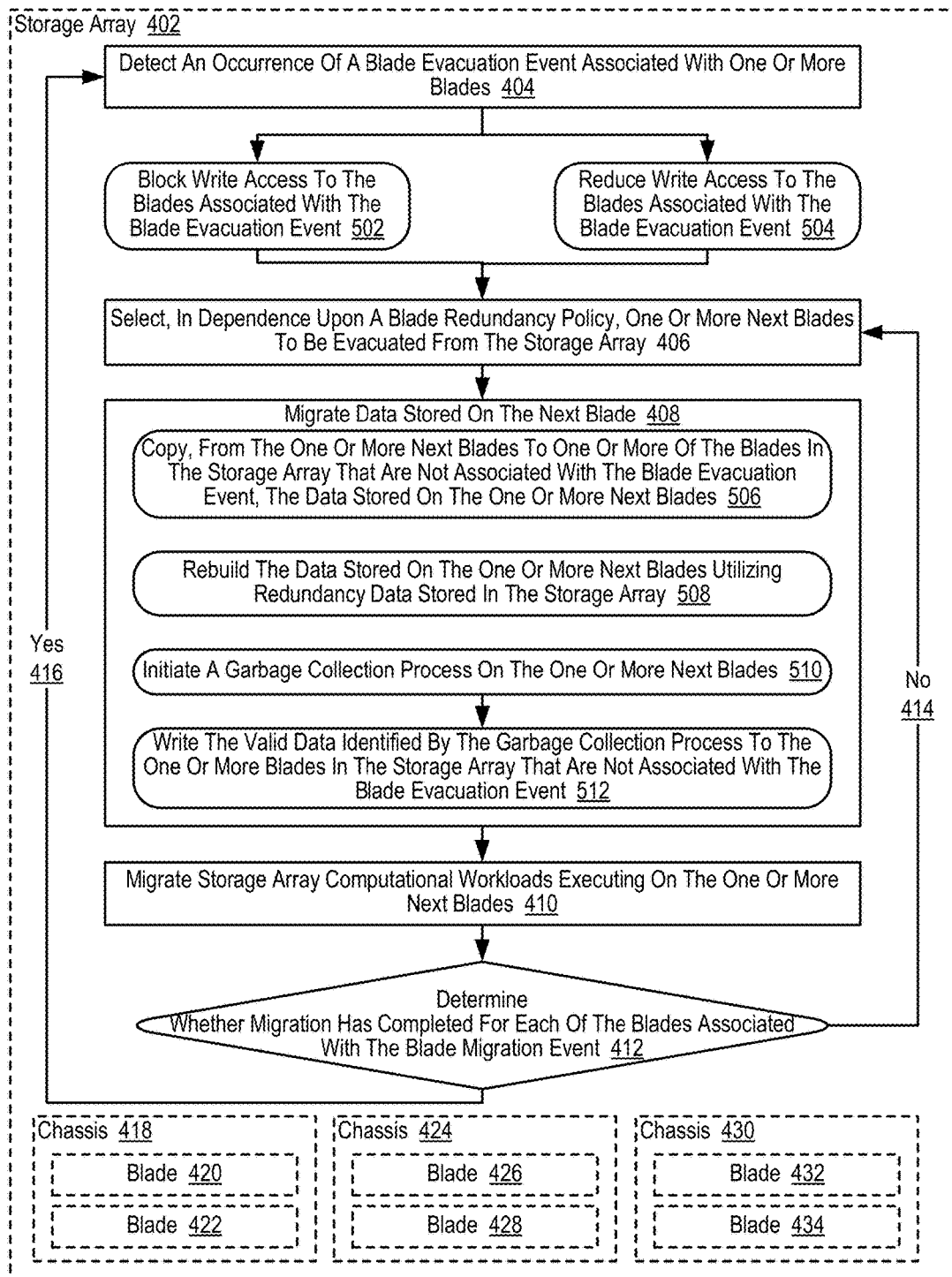
FIG. 5 sets forth a flow chart illustrating an additional example method of evacuating blades in a storage array that includes a plurality of blades according to embodiments of the present disclosure.

For further explanation, FIG. 5 sets forth a flow chart illustrating an additional example method of evacuating blades in a storage array (402) that includes a plurality of blades (420, 422, 426, 428, 432, 434) according to embodiments of the present disclosure. The example method depicted in FIG. 5 is similar to the example method depicted in FIG. 4, as the example method depicted in FIG. 5 also includes detecting (404) an occurrence of a blade evacuation event associated with one or more blades, selecting (406) one or more next blades to be evacuated from the storage array (402), migrating (408), from the one or more next blades to one or more blades in the storage array that are not associated with the blade evacuation event, data stored on the next blade, and migrating (410), from the one or more next blades to one or more blades in the storage array that are not associated with the blade evacuation event, storage array computational workloads executing on the one or more next blades.

The example method depicted in FIG. 5 also includes blocking (502) write access to the blades associated with the blade evacuation event. Blocking (502) write access to the blades associated with the blade evacuation event may be carried out, for example, by each of the storage array controllers in the storage array (402) ceasing to issue write operations to the blades associated with the blade evacuation event. In such an example, each storage array controller may maintain a list or other data structure that identifies all blades in the storage array (402) that should not be utilized to service write operations. Because the storage array controller is responsible for directing all access requests to the blades (420, 422, 426, 428, 432, 434) in the storage array (402), the storage array controller may ultimately enforce a policy to block (502) all write access to the blades associated with the blade evacuation event. In an alternative embodiment, blocking (502) write access to the blades associated with the blade evacuation event may be carried out, for example, by each of the authorities (or any other entity that initiates write operations) ceasing to issue write operations to the blades associated with the blade evacuation event. In such an example, each of the authorities (or any other entity that initiates write operations) may maintain a list or other data structure that identifies all blades in the storage array (402) that should not be utilized to service write operations. In yet an alternative embodiment, the blades associated with the blade evacuation event may respond to a request to write data with an error message or other indication that the request was not serviced, such that blocking (502) write access to the blades associated with the blade evacuation event may be carried out by the blades that are associated with the blade evacuation event themselves. In such an example, the blades that are associated with the blade evacuation event are essentially placed in a read-only mode as read requests may continue to be serviced until the blades are fully decommissioned and removed from the storage array (402).

The example method depicted in FIG. 5 also includes reducing (504) write access to the blades associated with the blade evacuation event. In the example method depicted in FIG. 5, reducing (504) write access to the blades associated with the blade evacuation event may be carried out, for example, by only allowing the blades that are associated with the blade evacuation event to service a predetermined number of write requests using the mechanisms described in the preceding paragraph. Readers will appreciate that in the examples described above, where write access to the blades associated with the blade evacuation event is reduced (504) or blocked (502), the presence of deduplicated data on the blades associated with the blade evacuation event may be treated as a special case. Data deduplication is a data compression technique whereby duplicate copies of repeating data are eliminated. Through the use of data deduplication techniques, a unique chunk of data (e.g., the master copy) may be stored once in the storage array (402) and all additional occurrences of the chunk of data are replaced with a small reference that points to the stored chunk. The deduplicated data on the blades associated with the blade evacuation event may therefore be embodied, for example, as a piece of data that is stored on the blades associated with the blade evacuation event, where the piece of data is pointed to by other occurrences of identical data in the storage array (402). The presence of deduplicated data on the blades associated with the blade evacuation event may be handled, for example, by allowing read-write access to the deduplicated data while enabling read-only access to (or blocking write access to) the remaining portions of the blades associated with the blade evacuation event (e.g., those portions that do not contain deduplicated data). Alternatively, the deduplicated data may be migrated to another blade in the storage array and all references to the deduplicated data may be updated to point to the new location where the deduplicated data is stored. Furthermore, if a write request is received that would normally be deduplicated due to the presence of identical data on the blades associated with the blade evacuation event, such a write request may be serviced by a blade that is not associated with the blade evacuation event, the metadata associated with deduplicated instances of such data may be updated to point to the newly written instance of the data, and the instance of the data that is stored on the blade that is associated with the blade evacuation event may be invalidated.

In the example method depicted in FIG. 5, migrating (408) data stored on the one or more next blades to be evacuated from the storage array (402) to one or more blades in the storage array (402) that are not associated with the blade evacuation event can include copying (506), from the one or more next blades to one or more of the blades in the storage array (402) that are not associated with the blade evacuation event, the data stored on the one or more next blades. Copying (506) the data stored on the one or more next blades to be evacuated from the storage array (402) may be carried out, for example, by a storage array controller or other device reading the data stored on the one or more next blades to be evacuated from the storage array (402) and the storage array controller or other device writing such data to one or more of the blades that are not associated with the blade evacuation event. In an alternative embodiment, the one or more next blades to be evacuated from the storage array (402) themselves may be configured to support a copy operation that takes an identification of a source and an identification of a target as operands. In such an example, the operands may be specified as a range of physical addresses, a range of virtual addresses, a base address and an indication of the size of the data that is to be copied, an identification of a logical grouping of data such as a volume, and so on.

In the example method depicted in FIG. 5, migrating (408) data stored on the one or more next blades to be evacuated from the storage array (402) to one or more blades in the storage array (402) that are not associated with the blade evacuation event can alternatively include rebuilding (508) the data stored on the one or more next blades utilizing redundancy data stored in the storage array (402). Rebuilding (508) the data stored on the one or more next blades utilizing redundancy data stored in the storage array (402) may be carried out through the use of RAID or RAID-like operations. In such an example, at least a portion of the data stored on the blades associated with the blade evacuation event may be part of a data set that is striped across a plurality of blades. As such, redundancy data and/or data stored on blades other than the one or more next blades to be evacuated from the storage array (402) may be used to reconstruct the data stored on the one or more next blades to be evacuated from the storage array (402). In such an example, the reconstructed data may be stored on the one or more blades in the storage array (402) that are not associated with the blade evacuation event.

Readers will appreciate that because migrating (408) data stored on the one or more next blades to be evacuated from the storage array (402) may be carried out by rebuilding (508) the data stored on the one or more next blades utilizing redundancy data stored in the storage array (402), the evacuation process may be terminated early in some instances (at least relative to a system that does not include redundancy data). Consider an example in which three blades (420, 426, 432) are targeted for removal from the storage array (402) as a blade evacuation event that is associated with the three blades (420, 426, 432) is detected (404). In such an example, further assume that the storage array (402) includes a sufficient amount of redundancy data such that two blades may be lost without resulting in the loss of data. Further assume that all data that is stored on one of the blades (420) has been successfully migrated. In such an example, because two blades may be lost without resulting in the loss of data, it may be possible to terminate the evacuation process early, remove the other two blades (426, 432) that are associated with the blade evacuation event, and install two new blades, as the data that was previously stored on the other two blades (426, 432) that are associated with the blade evacuation event may be rebuilt only the newly inserted new blades. As such, so long as the computational workloads that are executing on the other two blades (426, 432) have been successfully migrated, no content on the other two blades (426, 432) will be lost. Readers will appreciate that deciding whether to terminate the evacuation process early may therefore be carried out by: identifying one or more blades that are associated with the blade evacuation event and whose content has not been fully migrated; determining whether all computational workloads have been migrated away from the blades whose content has not been fully migrated; determining whether the data stored on the blades whose content has not been fully migrated can be rebuilt; and responsive to determining that the data stored on the blades whose content has not been fully migrated can be rebuilt, terminating the migration process.

In the example method depicted in FIG. 5, migrating (408) data stored on the one or more next blades to be evacuated from the storage array (402) to one or more blades in the storage array (402) that are not associated with the blade evacuation event can alternatively include initiating (510) a garbage collection process on the one or more next blades. A garbage collection process may be embodied, for example, as a module of computer program instructions executing on computer hardware such as a computer processor or a microcontroller. The garbage collection process may be configured to reclaim memory that is occupied by data that is no longer in use.

In the example method depicted in FIG. 5, the garbage collection process may identify valid data stored on the one or more next blades and invalid data stored on the one or more next blades. As described above, data that is no longer in use may be referred to herein as invalid data whereas data that is still in use may be referred to herein as valid data. The garbage collection process may identify valid data stored on the one or more next blades to be evacuated from the storage array (402) and the garbage collection process can also identify invalid data on the one or more next blades to be evacuated from the storage array (402). The garbage collection process may identify valid data stored on the one or more next blades to be evacuated from the storage array (402) and the garbage collection process can also identify invalid data stored on the one or more next blades to be evacuated from the storage array (402), for example, by reading metadata that is associated with data stored in the storage array (402). Such metadata can include information that can be used to determine whether a particular piece of data is valid or invalid. The metadata may include such information as the result of steps carried out when data is written to the blades (420, 422, 426, 428, 432, 434).

Consider an example in which the storage devices within the blades (420, 422, 426, 428, 432, 434) are embodied as SSDs where data is written to the SSDs in 16 KB pages. Attached to each page in the SSD may be a small amount (e.g., 8 Bytes) of additional memory that is used to store metadata associated with the page. The SSDs may be configured to receive requests to write data from a storage array controller or other device, where the requests to write data include a virtual address that the SSD subsequently translates into a physical address. In such an example, the virtual-to-physical address translations may be stored by the SSD in a translation table that is maintained by the SSD. When the SSD receives a request to write data to a particular virtual address, the SSD may write the data to a first page that is associated with a first physical address and the SSD may also set a predetermined bit in the small amount of additional memory that is used to store metadata associated with the first page to a value indicating that the data contained therein is valid. If the SSD subsequently receives a second request to write data to the particular virtual address, the SSD may write the data to a second page that is described by a second physical address and also set a predetermined bit in the small amount of additional memory that is used to store metadata associated with the second page to a value indicating that the data contained therein is valid. In addition, the SSD may set the predetermined bit in the small amount of additional memory that is used to store metadata associated with the first page to a value indicating that the data contained therein is invalid, while also updating the translation table to map the particular virtual address to the second physical address. In such a way, the garbage collection process may scan the metadata associated with each page to determine whether the contents of each page are valid or invalid. Readers will appreciate that in other embodiments, metadata that is associated with data stored in the storage array (402) may be stored and maintained in other ways.

In the example method depicted in FIG. 5, migrating (408) data stored on the one or more next blades to be evacuated from the storage array (402) to one or more blades in the storage array (402) that are not associated with the blade evacuation event can also include writing (512) the valid data identified by the garbage collection process to the one or more blades in the storage array that are not associated with the blade evacuation event. Writing (512) the valid data identified by the garbage collection process to the one or more blades in the storage array that are not associated with the blade evacuation event may be carried out, for example, by combining individual chunks of valid data that were identified by the garbage collection process into one or more blocks of valid data of a predetermined size and writing the one or more blocks of valid data of a predetermined size to one or more of the blades in the storage array that are not associated with the blade evacuation event.

Consider an example in which the storage devices within the blades (420, 422, 426, 428, 432, 434) are embodied as SSDs, where data can be written to the SSDs in 16 KB pages but data can only be erased from the SSDs by erasing an entire memory block that includes 256 16 KB pages. In such an example, individual chunks of valid data that were identified by the garbage collection process may be combined into 4 MB blocks (the size of a memory block in the SSD) and written to the SSD into a single memory block in the SSD. Readers will appreciate that by combining individual chunks of valid data that were identified by the garbage collection process into 4 MB blocks and writing the 4 MB blocks to a single memory block in the SSD, the single memory block in the SSD will only contain valid data. Writing the individual chunks of valid data that were identified by the garbage collection process into memory blocks on the SSD that include no invalid data can improve system performance relative to writing the individual chunks of valid data that were identified by the garbage collection process into a memory block in the SSD that already contains invalid data. System performance can be improved in such an example because the memory blocks in the SSD that already contain invalid data are ripe for garbage collection, meaning that any valid data contained in the memory blocks in the SSD that contain invalid data will need to be relocated when a garbage collection process examines the memory block in the SSD that already contains invalid data. Relocating data through a garbage collection process utilizes system resources as valid data contained in a memory block that is to be garbage collected must be written to a new location (additional writes) and the memory block that is to be garbage collected must also be erased (additional erase operations). As such, system performance may be improved by reducing the amount of memory blocks that need to be garbage collected and reducing the amount of data that needs to be relocated.

Readers will appreciate that the preceding paragraph describes only example of combining individual chunks of valid data that were identified by the garbage collection process into one or more blocks of valid data of a predetermined size and writing the one or more blocks of valid data of a predetermined size to one or more of the blades in the storage array that are not associated with the blade evacuation event. Other examples exist and other policies may be put in place in pursuit of other objectives.

Although the preceding paragraphs discuss embodiments where migrating (408) data stored on the one or more next blades to be evacuated from the storage array (402) includes copying (506) the data stored on the one or more next blades, or rebuilding (508) the data stored on the one or more next blades utilizing redundancy data stored in the storage array (402), or initiating (510) a garbage collection process on the one or more next blades, readers will appreciate that a combination of such techniques may be applied to migrate (408) the data that is stored on the one or more next blades to be evacuated from the storage array (402). In addition, one or more policies may be implemented to determine the extent to which each of the techniques will be applied to migrate (408) the data that is stored on the one or more next blades to be evacuated from the storage array (402). Such a policy may specify, for example, that migrating (408) data stored on the one or more next blades to be evacuated from the storage array (402) should be carried out primarily by rebuilding (508) the data stored on the one or more next blades utilizing redundancy data stored in the storage array (402) in situations where there is a relatively small amount of garbage on a particular blade, as rebuilding the data may be more efficient than executing a garbage collection process that will ultimately collect very little garbage. Readers will appreciate that many other policies may be enforced and that such policies may be applied to determine how data will be migrated from each blade, to determine how data will be migrated from different portions of storage on each blade, and so on.

Figure 6:
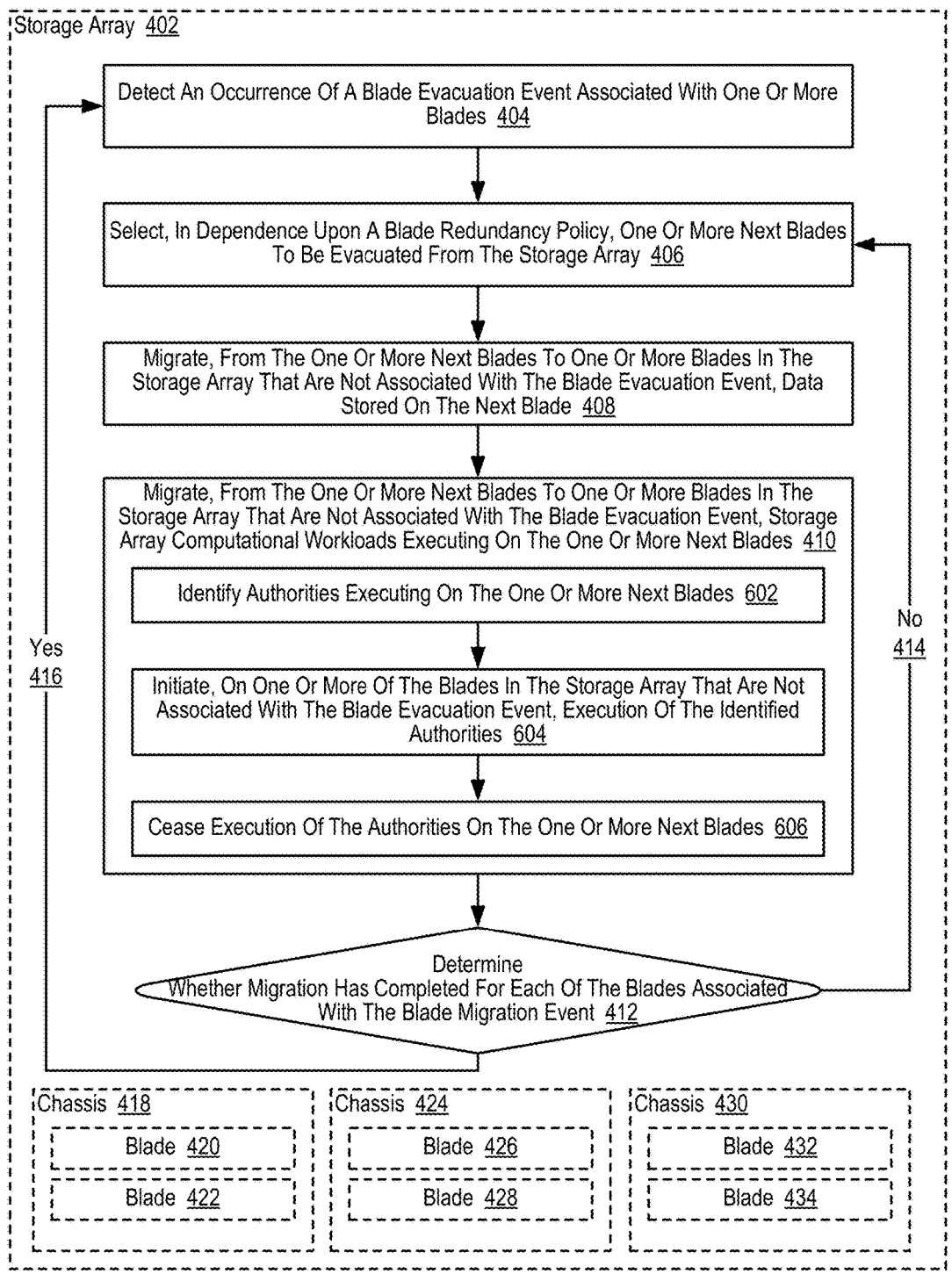
FIG. 6 sets forth a flow chart illustrating an additional example method of evacuating blades in a storage array that includes a plurality of blades according to embodiments of the present disclosure.

For further explanation, FIG. 6 sets forth a flow chart illustrating an additional example method of evacuating blades in a storage array (402) that includes a plurality of blades (420, 422, 426, 428, 432, 434) according to embodiments of the present disclosure. The example method depicted in FIG. 6 is similar to the example method depicted in FIG. 4, as the example method depicted in FIG. 6 also includes detecting (404) an occurrence of a blade evacuation event associated with one or more blades, selecting (406) one or more next blades to be evacuated from the storage array (402), migrating (408), from the one or more next blades to one or more blades in the storage array that are not associated with the blade evacuation event, data stored on the next blade, and migrating (410), from the one or more next blades to one or more blades in the storage array that are not associated with the blade evacuation event, storage array computational workloads executing on the one or more next blades.

In the example method depicted in FIG. 6, migrating (410) storage array computational workloads executing on the one or more next blades can include identifying (602) authorities executing on the one or more next blades to be evacuated from the storage array (402). In the example method depicted in FIG. 6, authorities such as the authorities described above, may represent one form of computational workloads that are to be migrated (410). In such an example, each authority executing on a blade may register with the blade or the blade may otherwise have knowledge that the authority is executing on compute resources in the blade. As such, identifying (602) authorities executing on the one or more next blades to be evacuated from the storage array (402) may be carried out, for example, by identifying information such as an authority ID for each authority that is executing on the one or more next blades to be evacuated from the storage array (402).

In the example method depicted in FIG. 6, migrating (410) storage array computational workloads executing on the one or more next blades can also include initiating (604), on one or more of the blades in the storage array (402) that are not associated with the blade evacuation event, execution of the authorities identified (602) in the preceding paragraph. Initiating (604) execution of the authorities identified (602) in the preceding paragraph on one or more of the blades in the storage array (402) that are not associated with the blade evacuation event may be carried out, for example, by copying source code for the authority to one or more of the blades in the storage array (402) that are not associated with the blade evacuation event and initiating execution of such source code. In the example method depicted in FIG. 6, migrating (410) storage array computational workloads executing on the one or more next blades can also include ceasing (606) execution of the authorities on the one or more next blades to be evacuated from the storage array (402).

Figure 7:
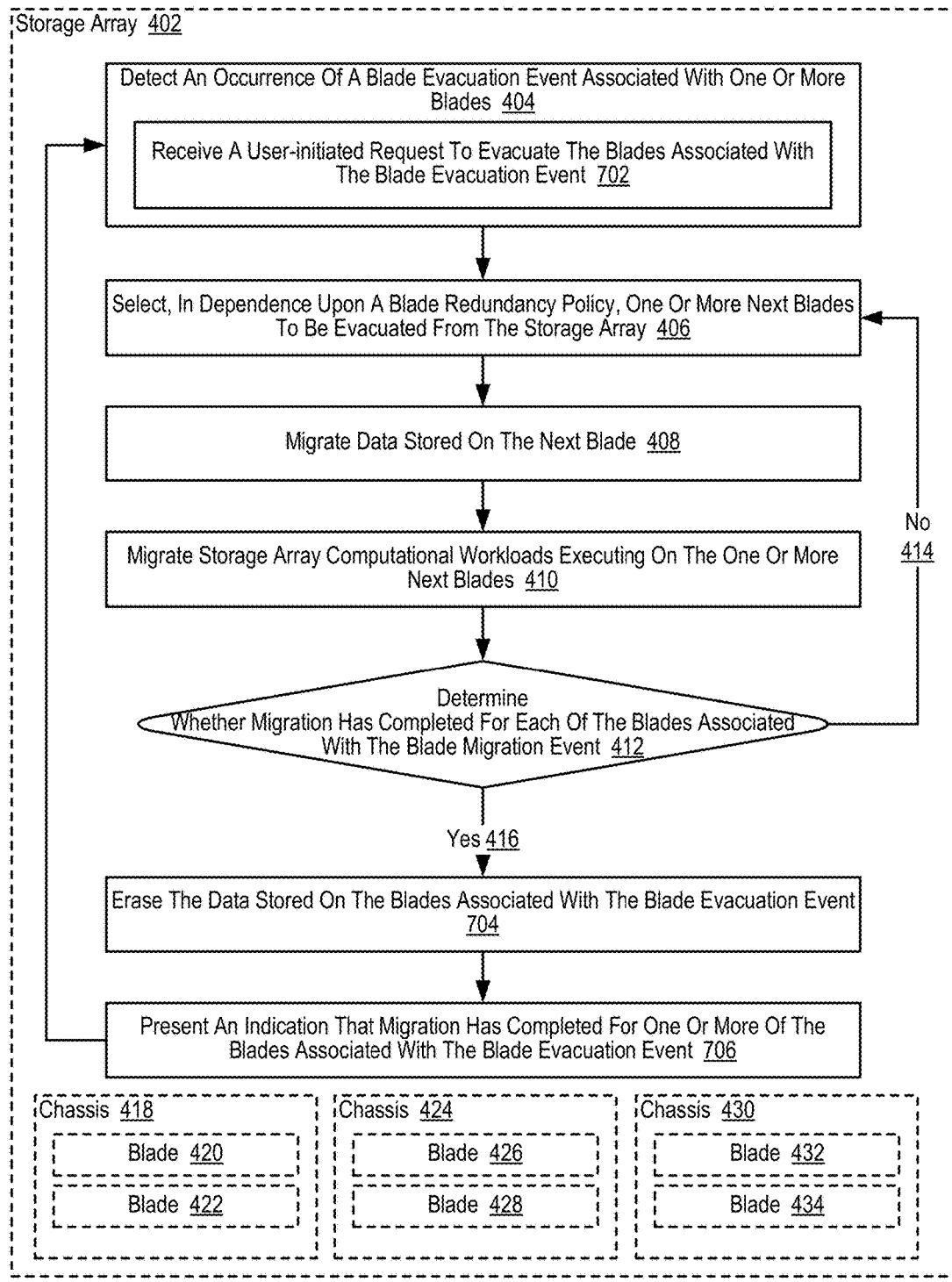
FIG. 7 sets forth a flow chart illustrating an additional example method of evacuating blades in a storage array that includes a plurality of blades according to embodiments of the present disclosure.

For further explanation, FIG. 7 sets forth a flow chart illustrating an additional example method of evacuating blades in a storage array (402) that includes a plurality of blades (420, 422, 426, 428, 432, 434) according to embodiments of the present disclosure. The example method depicted in FIG. 7 is similar to the example method depicted in FIG. 4, as the example method depicted in FIG. 7 also includes detecting (404) an occurrence of a blade evacuation event associated with one or more blades, selecting (406) one or more next blades to be evacuated from the storage array (402), migrating (408), from the one or more next blades to one or more blades in the storage array that are not associated with the blade evacuation event, data stored on the next blade, and migrating (410), from the one or more next blades to one or more blades in the storage array that are not associated with the blade evacuation event, storage array computational workloads executing on the one or more next blades.

In the example method depicted in FIG. 7, detecting (404) an occurrence of a blade evacuation event associated with one or more blades can include receiving (702) a user-initiated request to evacuate the blades associated with the blade evacuation event. The user-initiated request to evacuate the blades associated with the blade evacuation event may be received (702), for example, through the use of a command-line interface, through the use of a user interface (e.g., a GUI presented on a display screen) that presents an inventory of the blades that are included in the storage array (402) and that also allows the user of the user interface to select one or more blades that are to be designated for removal from the storage array (402), of through the use of some other interface. Readers will appreciate that a user-initiated request to evacuate the blades associated with the blade evacuation event may be received (702) in other ways in other embodiments. In an alternative embodiment, detecting (404) an occurrence of a blade evacuation event associated with one or more blades can include receiving a system-initiated request to evacuate the blades associated with the blade evacuation event. Such a system-initiated request to evacuate the blades associated with the blade evacuation event may be generated, for example, as part of a scheduled upgrade, in response to blades reaching a predetermined age, in response to blade exhibiting poor performance, and for other reasons.

The example method depicted in FIG. 7 also includes erasing (704) the data stored on the blades associated with the blade evacuation event. In such an example, erasing (704) the data stored on the blades associated with the blade evacuation event may be carried out as a security measure to ensure that once the blade is removed from the storage array (402), the data contained on such a blade will not fall into the wrong hands.

The example method depicted in FIG. 7 also includes presenting (706) an indication that migration has completed for one or more of the blades associated with the blade evacuation event. In the example method depicted in FIG. 7, the indication that migration has completed for one or more of the blades associated with the blade evacuation event may be embodied, for example, as a message that appears on a GUI, as a message that is sent to a designated user such as a system administrator, through the use of a light on a particular blade that may be illuminated once migration has completed, and so on.

Readers will appreciate that although erasing (704) the data stored on the blades associated with the blade evacuation event and presenting (706) an indication that migration has completed for one or more of the blades associated with the blade evacuation event are illustrated in FIG. 7 as occurring after the storage array (402) affirmatively (416) determines that migration has completed for each of the blades associated with the blade migration event. In alternative embodiments, however, erasing (704) the data stored on the blades associated with the blade evacuation event and/or presenting (706) an indication that migration has completed for one or more of the blades associated with the blade evacuation event may occur on a blade by blade basis, after the storage array (402) determines that migration has not (414) completed for each of the blades associated with the blade migration event.

Figure 8:
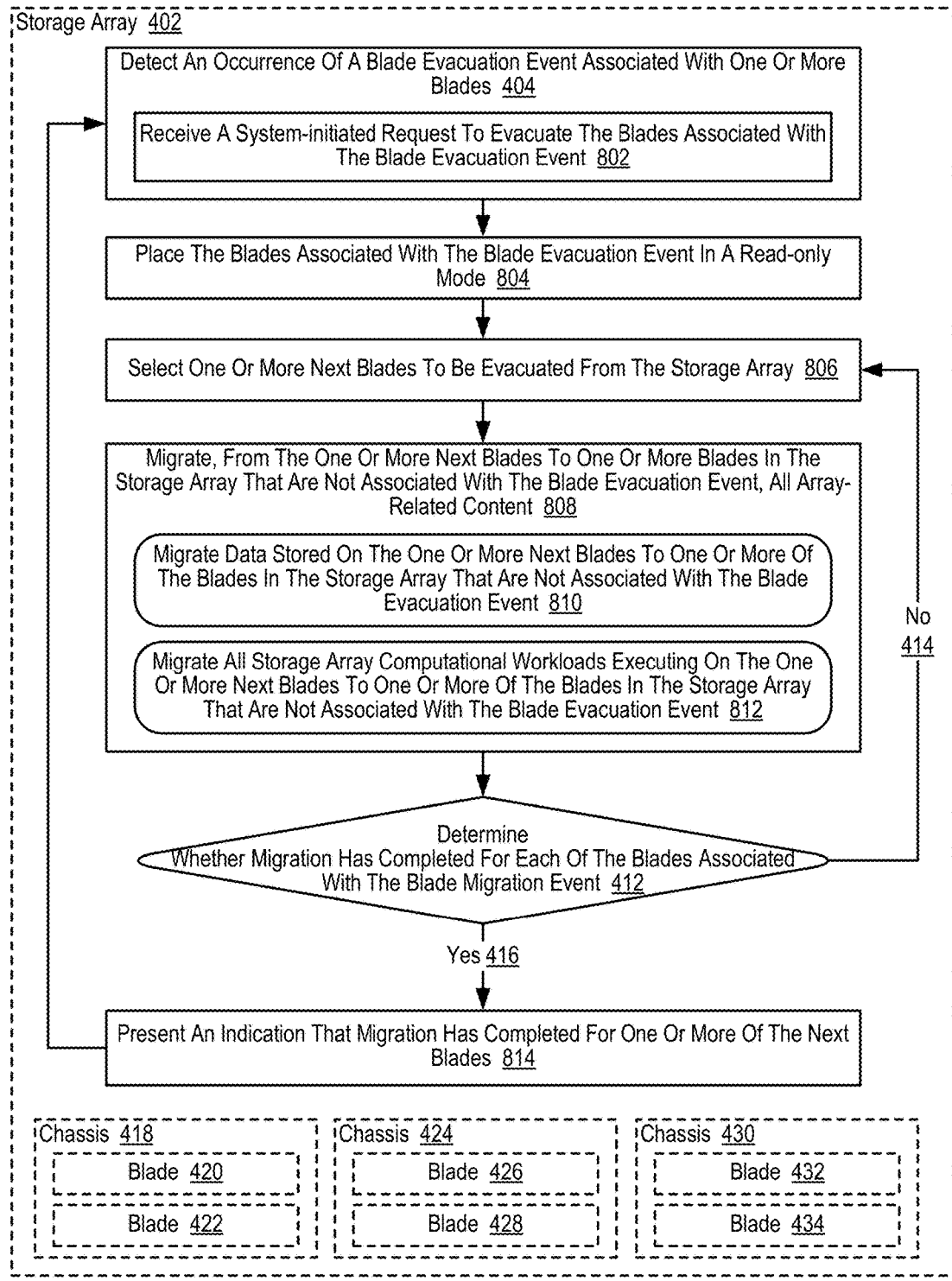
FIG. 8 sets forth a flow chart illustrating an additional example method of evacuating blades in a storage array that includes a plurality of blades according to embodiments of the present disclosure.

For further explanation, FIG. 8 sets forth a flow chart illustrating an additional example method of evacuating blades in a storage array (402) that includes a plurality of blades (420, 422, 426, 428, 432, 434) according to embodiments of the present disclosure. The example method depicted in FIG. 8 is similar to the example method depicted in FIG. 4, as the example method depicted in FIG. 8 also includes detecting (404) an occurrence of a blade evacuation event associated with one or more blades.

In the example method depicted in FIG. 8, detecting (404) an occurrence of a blade evacuation event associated with one or more blades can include receiving (802) a system-initiated request to evacuate the blades associated with the blade evacuation event. The system-initiated request to evacuate the blades associated with the blade evacuation event may be generated, for example, by a system management module or other form of computer program instructions executing on computer hardware such as a computer processor. Such a system-initiated request to evacuate the blades associated with the blade evacuation event may be generated, for example, as part of a scheduled upgrade, in response to blades reaching a predetermined age, in response to blade exhibiting poor performance, and for other reasons.

The example method depicted in FIG. 8 also includes placing (804) the blades associated with the blade evacuation event in a read-only mode. Placing (804) the blades associated with the blade evacuation event in a read-only mode may be carried out, for example, by configuring a setting within the blades associated with the blade evacuation event that will cause the blades to reject any incoming write requests, by notifying all entities that issue write requests that write requests are not to be directed to the blades that are associated with the blade evacuation event, and so on. In such an example, the blades that are associated with the blade evacuation event may continue to service read requests directed to the blades, but the blades that are associated with the blade evacuation event may cease to service write requests as any valid data stored on such blades will ultimately be migrated to blades in the storage array (402) that are not associated with the blade evacuation event.

The example method depicted in FIG. 8 also includes selecting (806) one or more next blades to be evacuated from the storage array (402). Selecting (806) one or more next blades to be evacuated from the storage array (402) may be carried out in dependence upon a variety of considerations. For example, the number of I/O requests that the storage array (402) must be able to service as specified in a service level agreement may be taken into consideration when selecting (806) one or more next blades to be evacuated from the storage array (402). Consider an example in which three blades (420, 428, 434) are associated with the blade evacuation event, indicating that the three blades (420, 428, 434) will eventually be removed from the storage array (402). In such an example, however, assume that the storage array (402) can only tolerate the loss of two blades at any given point in time without violating the terms of the service level agreement, as the loss of more than two blades at any given time will prevent the storage array (402) from servicing the number of I/O requests that the storage array (402) must be able to service as specified in a service level agreement. Because the storage array (402) can only tolerate the loss of two blades at any given point in time without violating the terms of the service level agreement, it may be undesirable to effectively treat all three blades (420, 428, 434) as if they are unavailable. As such, a staggered decommissioning of the three blades (420, 428, 434) associated with the blade evacuation event may be necessary to avoid the violation of the service level agreement. A staggered decommissioning of the three blades (420, 428, 434) associated with the blade evacuation event may be carried out, for example, by selecting (806) a first blade (420) associated with the blade evacuation event as the next blade to be evacuated from the storage array (402), selecting (806) a second blade (428) associated with the blade evacuation event as the next blade to be evacuated from the storage array (402) only after the first blade (420) has been evacuated, and selecting (806) a third blade (434) associated with the blade evacuation event as the next blade to be evacuated from the storage array (402) only after the second blade (428) has been evacuated. Readers will appreciate that in other embodiments, additional or different factors may be taken into consideration when selecting (806) one or more next blades to be evacuated from the storage array (402). For example, selecting (806) one or more next blades to be evacuated from the storage array (402) may be carried out in dependence upon a blade redundancy policy, as described above. Readers will appreciate that in other embodiments, selecting (806) one or more next blades to be evacuated from the storage array (402) may be carried out in dependence upon other considerations such as, for example, an amount of processing resources that are to be allocated for relocating data stored on and processing workloads executing on blades that are associated with the blade evacuation event, an amount of I/O requests that are being directed to the storage array (402) as more resources may be dedicated to relocating data stored on and processing workloads executing on blades that are associated with the blade evacuation event during periods of low I/O activity, and so on.

The example method depicted in FIG. 8 also includes migrating (808), from the one or more next blades to one or more blades in the storage array (402) that are not associated with the blade evacuation event, all array-related content. The array-related content can include, for example, data that is stored on the storage array (402), computational workloads that are executing on a blade (420, 422, 426, 428, 432, 434) in the storage array (402), and so on. In the example method depicted in FIG. 8, migrating (808), from the one or more next blades to one or more blades in the storage array (402) that are not associated with the blade evacuation event, all array-related content can therefore include migrating (810) data stored on the one or more next blades to one or more of the blades in the storage array (402) that are not associated with the blade evacuation event. Migrating (808), from the one or more next blades to one or more blades in the storage array (402) that are not associated with the blade evacuation event, all array-related content can alternatively include migrating (812) all storage array computational workloads executing on the one or more next blades to one or more of the blades in the storage array (402) that are not associated with the blade evacuation event.

Readers will appreciate that, as described above, blades in the storage array (402) may be embodied as storage blades, compute blades, and hybrid blades. When a storage blade is associated with a blade evacuation event, migrating (808) all array-related content from the storage blade may include migrating (810) data stored on the storage blade to one or more of the blades in the storage array (402) that are not associated with the blade evacuation event. When a compute blade is associated with a blade evacuation event, however, migrating (808) all array-related content from the compute blade may include migrating (812) all storage array computational workloads executing on the compute blade to one or more of the blades in the storage array (402) that are not associated with the blade evacuation event. Likewise, when a hybrid blade is associated with a blade evacuation event, migrating (808) all array-related content from the hybrid blade may include migrating (810) data stored on the hybrid blade to one or more of the blades in the storage array (402) that are not associated with the blade evacuation event, as well as migrating (812) all storage array computational workloads executing on the hybrid blade to one or more of the blades in the storage array (402) that are not associated with the blade evacuation event.

In the example method depicted in FIG. 8, migrating (808), from the one or more next blades to one or more blades in the storage array (402) that are not associated with the blade evacuation event, all array-related content may be carried out in dependence upon a migration policy. Such a migration policy can place include information that is used to place limitations or restrictions on the migration process. Such a migration policy may specify, for example, a maximum amount of time that may allocated for migrating array-related content, a maximum amount of resources that may be dedicated to migrating array-related content, criteria for selecting which blades that are not associated with a blade evacuation event should be selected for receiving array-related content from blades that are associated with the blade evacuation event, and so on.

In the example method depicted in FIG. 8, the migration policy may also specify one or more performance criteria for the storage array (402). The one or more performance criteria may include information that identifies performance levels that the storage array (402) must maintain and therefore may represent a limitation on the amount of storage array (402) resources that may be utilized for migrating (808) all array-related content from the one or more next blades to be evacuated from the storage array (402) to one or more blades in the storage array (402) that are not associated with the blade evacuation event. Such performance criteria may include, for example, an amount of IOPS that the storage array (402) must be able to service, an amount of network bandwidth that should be reserved for servicing I/O requests directed to the storage array, an amount of processing cycles that the storage array (402)

must make available for computational workloads that are executing on the storage array (402), and so on. In such an example, the extent to which all array-related content is migrated (808) may be limited by such performance criteria for the storage array (402), as sufficient resources should be reserved for servicing I/O requests directed to the storage array (or otherwise delivering the required level of service) rather than dedicating such resources to the migration of all array-related content from the one or more next blades that are to be evacuated from the storage array (402) to one or more blades in the storage array (402) that are not associated with the blade evacuation event.

The example method depicted in FIG. 8 also includes presenting (814) an indication that migration has completed for one or more of the next blades to be evacuated from the storage array (402). In the example method depicted in FIG. 7, the indication that migration has completed for one or more of the next blades to be evacuated from the storage array (402) may be embodied, for example, as a message that appears on a GUI, as a message that is sent to a designated user such as a system administrator, through the use of a light on a particular blade that may be illuminated once migration has completed, and so on.

In the example method depicted in FIG. 8, the storage array includes a plurality of chassis (418, 424, 430), where each chassis (418, 424, 430) is configured to support a plurality of blades (420, 422, 426, 428, 432, 434). As such, at least a portion of the array-related content may be migrated (808) from a blade mounted in a first chassis to a blade mounted in a second chassis. For example, in the process of migrating (808) all array-related content from the one or more next blades to be evacuated from the storage array (402) to one or more blades in the storage array (402) that are not associated with the blade evacuation event, data stored on a blade in a first chassis may be migrated to one or more blades in a second chassis, computational workloads executing on a blade in a first chassis may be migrated to one or more blades in a second chassis, and so on.

Figure 9:
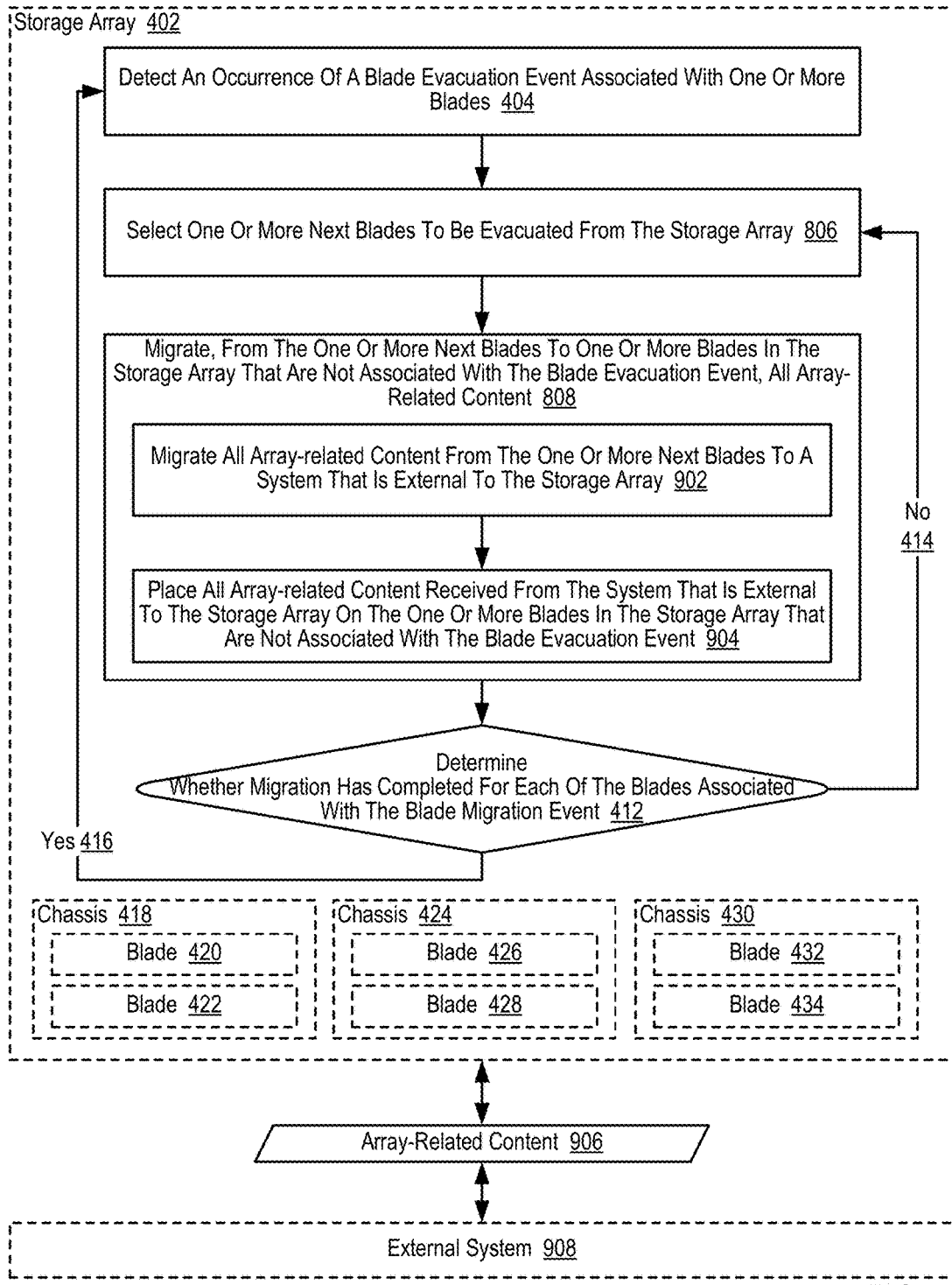
FIG. 9 sets forth a flow chart illustrating an additional example method of evacuating blades in a storage array that includes a plurality of blades according to embodiments of the present disclosure.

For further explanation, FIG. 9 sets forth a flow chart illustrating an additional example method of evacuating blades in a storage array (402) that includes a plurality of blades (420, 422, 426, 428, 432, 434) according to embodiments of the present disclosure. The example method depicted in FIG. 9 is similar to the example methods described above, as the example method depicted in FIG. 9 also includes detecting (404) an occurrence of a blade evacuation event associated with one or more blades, selecting (806) one or more next blades to be evacuated from the storage array (402), migrating (808) all array-related content from the one or more next blades to be evacuated from the storage array (402) to one or more blades in the storage array (402) that are not associated with the blade evacuation event.

In the example method depicted in FIG. 9, migrating (808) all array-related content from the one or more next blades to be evacuated from the storage array (402) to one or more blades in the storage array (402) that are not associated with the blade evacuation event can include migrating (902) all array-related content (906) from the one or more next blades to be evacuated from the storage array (402) to a system (908) that is external to the storage array (402). The system (908) that is external to the storage array (402) may be embodied, for example, as a cloud-based system that contains storage resources and processing resources that are available for use by the storage array (402), as another storage array that is available to temporarily store data and support computational workloads on behalf of the storage array (402), and so on. In such an example, array-related content (906) may be sent to the system (908) that is external to the storage array (402) via one or more data communications messages exchanged over a data communications network between the storage array (402) and the system (908) that is external to the storage array (402), array-related content (906) may be sent to the system (908) that is external to the storage array (402) via one or more remote direct memory access ('RDMA') interfaces between the storage array (402) and the system (908) that is external to the storage array (402), and in many other ways. Readers will appreciate that by migrating (902) all array-related content (906) from the one or more next blades to be evacuated from the storage array (402) to a system (908) that is external to the storage array (402), fewer resources within the storage array (402) may be consumed during the migration process, thereby enabling resources within the storage array (402) to remain available for supporting other storage array tasks such as servicing I/O operations.

In the example method depicted in FIG. 9, migrating (808) all array-related content from the one or more next blades to be evacuated from the storage array (402) to one or more blades in the storage array (402) that are not associated with the blade evacuation event can also include placing (904) all array-related content (906) received from the system (908) that is external to the storage array (402) on the one or more blades in the storage array (402) that are not associated with the blade evacuation event. The array-related content (906) may be received from the system (908) that is external to the storage array (402) at some point in time after the array-related content (906) was migrated (902) from the one or more next blades to be evacuated from the storage array (402) to the system (908) that is external to the storage array (402). As such, in between the time that the array-related content (906) was migrated (902) from the one or more next blades to be evacuated from the storage array (402) to the system (908) that is external to the storage array (402) and the time that the array-related content (906) was received from the system (908) that is external to the storage array (402), one or more of the blades that are associated with the evacuation event may be removed and replacement blades may be inserted. In such a way, the system (908) that is external to the storage array (402) may be used as resources that temporarily support the migration process. The array-related content (906) may be received from the system (908) that is external to the storage array (402), for example, via one or more data communications messages exchanged over a data communications network between the storage array (402) and the system (908) that is external to the storage array (402), via one or more RDMA interfaces between the storage array (402) and the system (908) that is external to the storage array (402), and in many other ways.

Figure 10:
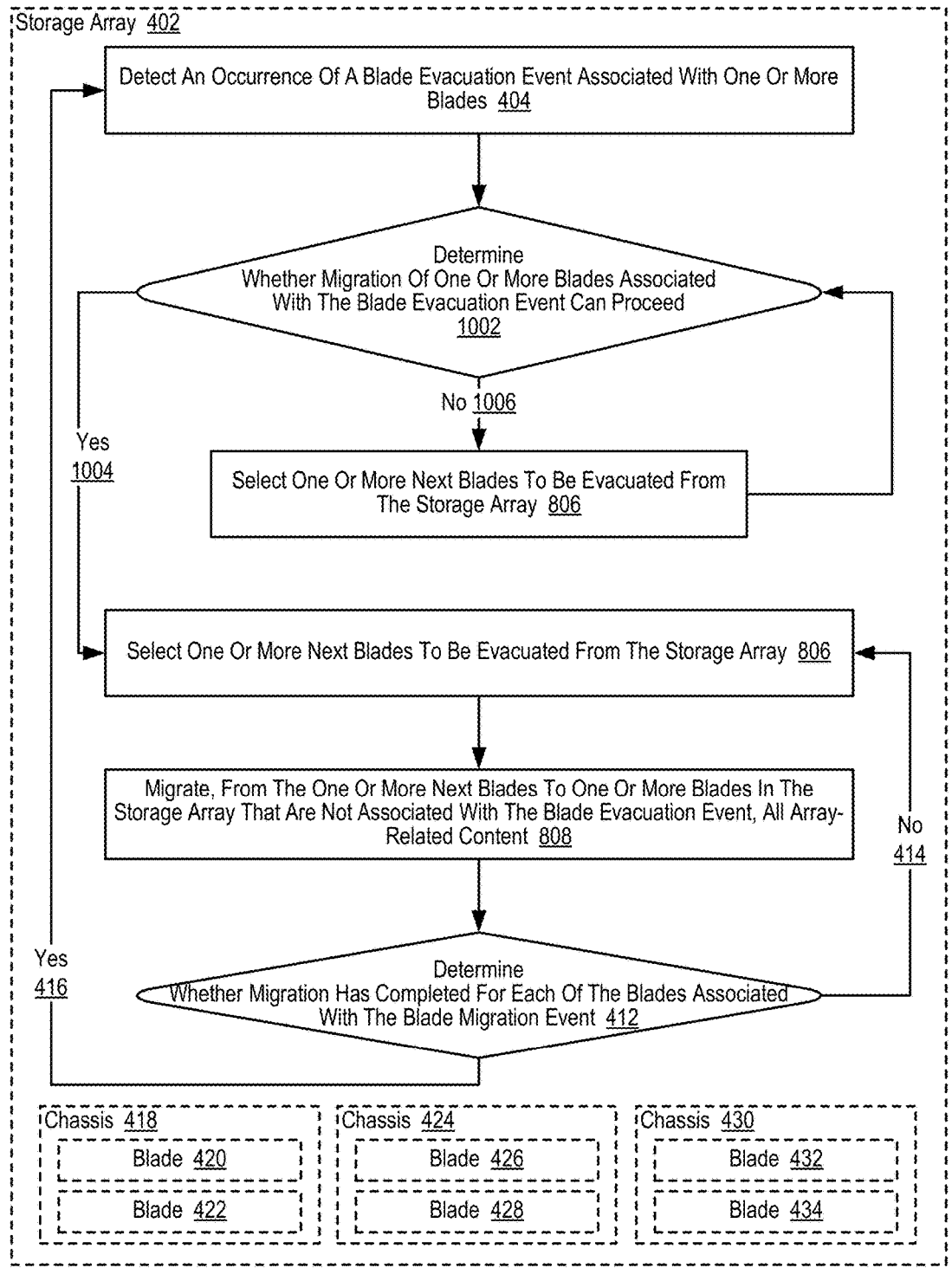
FIG. 10 sets forth a flow chart illustrating an additional example method of evacuating blades in a storage array that includes a plurality of blades according to embodiments of the present disclosure.

For further explanation, FIG. 10 sets forth a flow chart illustrating an additional example method of evacuating blades in a storage array (402) that includes a plurality of blades (420, 422, 426, 428, 432, 434) according to embodiments of the present disclosure. The example method depicted in FIG. 10 is similar to the example methods described above, as the example method depicted in FIG. 10 also includes detecting (404) an occurrence of a blade evacuation event associated with one or more blades, selecting (806) one or more next blades to be evacuated from the storage array (402), migrating (808) all array-related content from the one or more next blades to be evacuated from the storage array (402) to one or more blades in the storage array (402) that are not associated with the blade evacuation event.

The example method depicted in FIG. 10 also includes determining (1002) whether migration of one or more blades associated with the blade evacuation event can proceed. Determining (1002) whether migration of array-related content on one or more blades associated with the blade evacuation event can proceed may be carried out, for example, by determining whether migration of array-related content can proceed in a way that satisfies a migration policy, by determining whether a required level of system performance can be maintained when performing a migration of array-related content on one or more blades associated with the blade evacuation event, by determining whether a sufficient amount of available storage and compute resources exist on blades that are not associated with the blade evacuation event to perform a migration of array-related content on one or more blades associated with the blade evacuation event, and so on. If it is affirmatively (1004) determined that migration of array-related content on one or more blades associated with the blade evacuation event can proceed, the storage array (402) may proceed by selecting (806) one or more next blades to be evacuated from the storage array (402).

In the example method depicted in FIG. 10, if it is determined that migration of array-related content on one or more blades associated with the blade evacuation event cannot (1006) proceed, the storage array (402) may wait to proceed until the storage array detects (1008) a system configuration change. Detecting (1008) a system configuration change may be carried out, for example, by detecting that a new blade has been inserted into the storage array (402), by detecting that a previously unavailable blade in the storage array (402) has become available, by detecting that the amount of available storage resources or available compute resources in the storage array (402) has changed, by detecting that one or more system configuration settings for the storage array (402) has changed, and so on. In such an example, the system configuration changes may cause the storage array (402) to be able to proceed with the migration of array-related content on one or more blades associated with the blade evacuation event. As such, once a system configuration change has been detected (1008), the storage array (402) may proceed by again determining (1002) whether migration of one or more blades associated with the blade evacuation event can proceed.

Readers will appreciate that in addition to making determinations as to whether migration of array-related content on one or more blades associated with the blade evacuation event can (1004) or cannot (1006) proceed, in alternative embodiments, the migration of array-related content on one or more blades associated with the blade evacuation event may be paused and resumed for a variety of reasons. For example, the migration of array-related content on one or more blades associated with the blade evacuation event may be paused during periods of relatively heavy system utilization so that the storage array (402) can use its resources to service I/O requests rather than migrating array-related content away from the blades that are associated with the blade evacuation event. In such an example, the migration of array-related content on the blades that are associated with the blade evacuation event may be resumed during periods of relatively light system utilization, as the storage array (402) may have resources that can be used to migrate array-related content away from the blades that are associated with the blade evacuation event without degrading system performance to an unacceptable level. Readers will appreciate that the migration of array-related content away from the blades that are associated with the blade evacuation event may be paused and resumed for a variety of other reasons, and that pausing and resuming array-related content away from the blades that are associated with the blade evacuation event may occur in response to a user request, at the behest of system management software, or any combination thereof.

Figure 11:
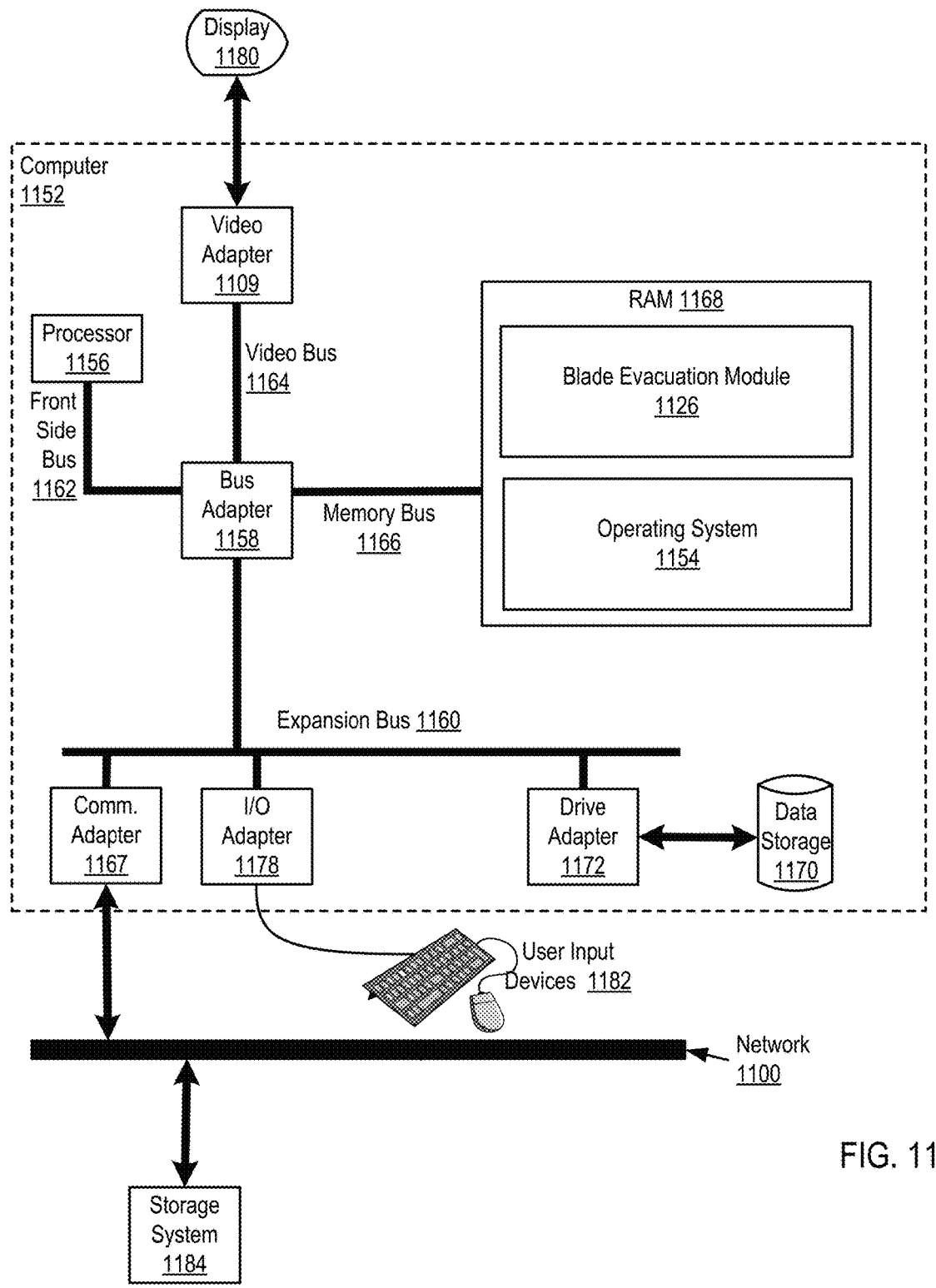
FIG. 11 sets forth a flow chart illustrating an additional example method of evacuating blades in a storage array that includes a plurality of blades according to embodiments of the present disclosure.

For further explanation, FIG. 11 sets forth a block diagram of automated computing machinery comprising an example computer (1152) useful in evacuating blades in a storage array that includes a plurality of blades according to embodiments of the present disclosure. The computer (1152) of FIG. 11 includes at least one computer processor (1156) or "CPU" as well as random access memory ("RAM") (1168) which is connected through a high speed memory bus (1166) and bus adapter (1158) to processor (1156) and to other components of the computer (1152). Stored in RAM (1168) is a blade evacuation module (1126), a module of computer program instructions for useful in evacuating blades in a storage array that includes a plurality of blades according to embodiments of the present disclosure. The blade evacuation module (1126) may be configured for evacuating blades in a storage array that includes a plurality of blades by: detecting an occurrence of a blade evacuation event associated with one or more blades; iteratively until migration has completed for each of the blades associated with the blade evacuation event: selecting, in dependence upon a blade redundancy policy, one or more next blades to be evacuated from the storage array; migrating, from the one or more next blades to one or more blades in the storage array that are not associated with the blade evacuation event, data stored on the next blade; and migrating, from the one or more next blades to one or more blades in the storage array that are not associated with the blade evacuation event, storage array computational workloads executing on the one or more next blades; blocking write access to the blades associated with the blade evacuation event; copying, from the one or more next blades to one or more of the blades in the storage array that are not associated with the blade evacuation event, the data stored on the one or more next blades; initiating a garbage collection process on the one or more next blades, wherein the garbage collection process identifies valid data stored on the one or more next blades and invalid data stored on the one or more next blades; and writing the valid data identified by the garbage collection process to the one or more blades in the storage array that are not associated with the blade evacuation event; rebuilding the data stored on the one or more next blades utilizing redundancy data stored in the storage array; identifying authorities executing on the one or more next blades; initiating, on one or more of the blades in the storage array that are not associated with the blade evacuation event, execution of the authorities; and ceasing execution of the authorities on the one or more next blades; receiving a user-initiated request to evacuate the blades associated with the blade evacuation event; receiving a system-initiated request to evacuate the blades associated with the blade evacuation event; erasing the data stored on the blades associated with the blade evacuation event; presenting an indication that migration has completed for one or more of the blades associated with the blade evacuation event; detecting an occurrence of a blade evacuation event associated with one or more blades; iteratively until migration has completed for each of the blades associated with the blade evacuation event: selecting one or more next blades to be evacuated from the storage array; and migrating, from the one or more next blades to one or more blades in the storage array that are not associated with the blade evacuation event, all array-related content; migrating data stored on the one or more next blades to one or more of the blades in the storage array that are not associated with the blade evacuation event; migrating all storage array computational workloads executing on the one or more next blades to one or more of the blades in the storage array that are not associated with the blade evacuation event; migrating all array-related content from the one or more next blades to a system that is external to the storage array; placing all array-related content received from the system that is external to the storage array on the one or more blades in the storage array that are not associated with the blade evacuation event; migrating all array-related content from the one or more next blades to one or more blades in the storage array that are not associated with the blade evacuation event in dependence upon a migration policy; placing the blades associated with the blade evacuation event in a read-only mode; determining whether migration of one or more blades associated with the blade evacuation event can proceed; responsive to determining that migration of one or more blades associated with the blade evacuation event cannot proceed, detecting a system configuration change; and performing other steps as described above.

Also stored in RAM (1168) is an operating system (1154). Operating systems useful in computers configured for evacuating blades in a storage array that includes a plurality of blades according to embodiments described herein include UNIX™, Linux, Microsoft XP™, AIX™, IBM's i5/OS™, and others as will occur to those of skill in the art. The operating system (1154) and blade evacuation module (1126) in the example of FIG. 11 are shown in RAM (1168), but many components of such software typically are stored in non-volatile memory also, such as, for example, on a disk drive (1170).

The example computer (1152) of FIG. 11 also includes disk drive adapter (1172) coupled through expansion bus (1160) and bus adapter (1158) to processor (1156) and other components of the computer (1152). Disk drive adapter (1172) connects non-volatile data storage to the computer (1152) in the form of disk drive (1170). Disk drive adapters useful in computers configured for evacuating blades in a storage array that includes a plurality of blades according to embodiments described herein include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (1152) of FIG. 11 includes one or more input/output ("I/O") adapters (1178). I/O adapters implement user-oriented input/output through, for example, software drivers and computer hardware for controlling output to display devices such as computer display screens, as well as user input from user input devices (1182) such as keyboards and mice. The example computer (1152) of FIG. 11 includes a video adapter (1109), which is an example of an I/O adapter specially designed for graphic output to a display device (1180) such as a display screen or computer monitor. Video adapter (1109) is connected to processor (1156) through a high speed video bus (1164), bus adapter (1158), and the front side bus (1162), which is also a high speed bus.

The example computer (1152) of FIG. 11 includes a communications adapter (1167) for data communications with a storage system (1184) as described above and for data communications with a data communications network (1100). Such data communications may be carried out serially through RS-232 connections, through external buses such as a Universal Serial Bus ('USB'), a Fibre Channel data communications link, an Infiniband data communications link, through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for evacuating blades in a storage array that includes a plurality of blades according to embodiments described herein include Ethernet (IEEE 802.3) adapters for wired data communications, Fibre Channel adapters, Infiniband adapters, and so on.

The computer (1152) may implement certain instructions stored on RAM (1168) for execution by processor (1156) for evacuating blades in a storage array that includes a plurality of blades. In some embodiments, evacuating blades in a storage array that includes a plurality of blades may be implemented as part of a larger set of executable instructions. For example, the blade evacuation module (1126) may be part of an overall system management process.

Readers will appreciate that although the examples described above are described in terms where one set of blades are being evacuated, multiple sets of blades may be evacuated in parallel. In such an example, a first blade evacuation event may be received that is associated with a first set of blades and a second blade evacuation event may be received that is associated with a second set of blades. When two distinct sets of blades are being evacuated, array-related content on the blades that are associated with the first blade evacuation event should not be migrated to blades that are associated with the second blade evacuation event, and vice versa.

Readers will further appreciate that although the example methods described above are depicted in a way where a series of steps occurs in a particular order, no particular ordering of the steps is required unless explicitly stated. Example embodiments of the present invention are described largely in the context of a fully functional computer system for evacuating blades in a storage array that includes a plurality of blades. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The present invention may be embodied as an apparatus, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, and so on. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network (WAN), or the connection may be made to an external computer (for example, through the Internet using an Internet Service Provider). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of evacuating blades in a storage array that includes a plurality of blades, the method comprising:

detecting an occurrence of a blade evacuation event associated with one or more blades, while each of the one or more blades are physically connected to the storage array;

iteratively until migration has completed for each of the blades associated with the blade evacuation event, while each of the one or more blades are physically connected to the storage array:

selecting, in dependence upon a blade redundancy policy, one or more next blades to be evacuated from the storage array;

modifying access to the one or more next blades, responsive to the selecting the one or more next blades to be evacuated from the storage array, wherein modifying the access comprises at least one of placing the one or more next blades in a read-only mode or reducing write access to the one or more next blades to a determined number of write requests;

migrating, from the one or more next blades to one or more blades in the storage array that are not associated with the blade evacuation event, data stored on the next blade; and migrating, from the one or more next blades to one or more blades in the storage array that are not associated with the blade evacuation event, storage array computational workloads executing on the one or more next blades.

2. The method of claim 1 further comprising blocking write access to the blades associated with the blade evacuation event.

3. The method of claim 1 wherein the blade redundancy policy specifies a maximum number of blades that may be lost without resulting in a loss of data stored on the storage array and a number of the one or more next blades selected to be evacuated from the storage array is less than or equal to the maximum number of blades that may be lost without resulting in the loss of data stored on the storage array.

4. The method of claim 1 wherein migrating the data stored on the one or more next blades further comprises copying, from the one or more next blades to one or more of the blades in the storage array that are not associated with the blade evacuation event, the data stored on the one or more next blades.

5. The method of claim 1 wherein migrating the data stored on the one or more next blades further comprises:

initiating a garbage collection process on the one or more next blades, wherein the garbage collection process identifies valid data stored on the one or more next blades and invalid data stored on the one or more next blades; and writing the valid data identified by the garbage collection process to the one or more blades in the storage array that are not associated with the blade evacuation event.

6. The method of claim 1 wherein migrating the data stored on the one or more next blades further comprises rebuilding the data stored on the one or more next blades utilizing redundancy data stored in the storage array.

7. The method of claim 1 wherein migrating the storage array computational workloads executing on the one or more next blades further comprises:

identifying authorities executing on the one or more next blades;

initiating, on one or more of the blades in the storage array that are not associated with the blade evacuation event, execution of the authorities; and ceasing execution of the authorities on the one or more next blades.

8. The method of claim 1 wherein detecting the occurrence of a blade evacuation event further comprises receiving a user-initiated request to evacuate the blades associated with the blade evacuation event.

9. The method of claim 1 further comprising erasing the data stored on the blades associated with the blade evacuation event.

10. The method of claim 1 wherein at least a portion of the data stored on the blades associated with the blade evacuation event is part of a data set that is striped across a plurality of blades.

11. The method of claim 1 further comprising presenting an indication that migration has completed for one or more of the blades associated with the blade evacuation event.

12. An apparatus for evacuating blades in a storage array that includes a plurality of blades, the apparatus comprising a computer processor and a computer memory, the computer memory including computer program instructions that, when executed by the computer processor, cause the apparatus to carry out the steps of:

detecting an occurrence of a blade evacuation event associated with one or more blades, while the one or more blades are physically connected to the storage array;

iteratively until migration has completed for each of the blades associated with the blade evacuation event, while the one or more blades are physically connected to the storage array:

selecting one or more next blades to be evacuated from the storage array;

modifying access to the one or more next blades, responsive to the selecting the one or more next blades to be evacuated from the storage array, wherein modifying the access comprises at least one of placing the one or more next blades in a read-only mode or reducing write access to the one or more next blades to a determined number of write requests; and migrating, from the one or more next blades to one or more blades in the storage array that are not associated with the blade evacuation event, all array-related content.

13. The apparatus of claim 12 wherein migrating, from the one or more next blades to one or more blades in the storage array that are not associated with the blade evacuation event, all array-related content further comprises migrating data stored on the one or more next blades to one or more of the blades in the storage array that are not associated with the blade evacuation event.

14. The apparatus of claim 12 wherein migrating, from the one or more next blades to one or more blades in the storage array that are not associated with the blade evacuation event, all array-related content further comprises migrating all storage array computational workloads executing on the one or more next blades to one or more of the blades in the storage array that are not associated with the blade evacuation event.

15. The apparatus of claim 12 wherein migrating, from the one or more next blades to one or more blades in the storage array that are not associated with the blade evacuation event, all array-related content further comprises:

migrating all array-related content from the one or more next blades to a system that is external to the storage array; and placing all array-related content received from the system that is external to the storage array on the one or more blades in the storage array that are not associated with the blade evacuation event.

16. The apparatus of claim 12 wherein migrating all array-related content from the one or more next blades to one or more blades in the storage array that are not associated with the blade evacuation event is carried out in dependence upon a migration policy.

17. The apparatus of claim 12 further comprising computer program instructions that, when executed by the computer processor, cause the apparatus to carry out the step of receiving a system-initiated request to evacuate the blades associated with the blade evacuation event.

18. The apparatus of claim 12 further comprising computer program instructions that, when executed by the computer processor, cause the apparatus to carry out the steps of:
   determining whether migration of one or more blades associated with the blade evacuation event can proceed; and
   responsive to determining that migration of one or more blades associated with the blade evacuation event cannot proceed, detecting a system configuration change.

19. The apparatus of claim 12 wherein:
   the storage array includes a plurality of chassis, each chassis configured to support a plurality of blades; and
   at least a portion of the array-related content is migrated from a blade mounted in the first chassis to a blade mounted in the second chassis.

* * * * *